United States Patent
Dao

(10) Patent No.: US 10,142,889 B2
(45) Date of Patent: Nov. 27, 2018

(54) METHOD AND SYSTEM FOR PROVIDING GUARANTEED QUALITY OF SERVICE AND QUALITY OF EXPERIENCE CHANNEL

(71) Applicant: Ngoc Dung Dao, Ottawa (CA)

(72) Inventor: Ngoc Dung Dao, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/590,637

(22) Filed: May 9, 2017

(65) Prior Publication Data

US 2017/0332282 A1 Nov. 16, 2017

Related U.S. Application Data

(60) Provisional application No. 62/336,327, filed on May 13, 2016.

(51) Int. Cl.
*H04W 28/02* (2009.01)
*H04W 28/22* (2009.01)
(Continued)

(52) U.S. Cl.
CPC .......... *H04W 28/22* (2013.01); *H04L 1/0002* (2013.01); *H04L 1/0026* (2013.01);
(Continued)

(58) Field of Classification Search
CPC . H04L 1/0002; H04L 1/0026; H04L 41/5009; H04L 41/5022; H04L 41/5025;
(Continued)

(56) References Cited

U.S. PATENT DOCUMENTS 9,414,250 B2* 8/2016 Froehlich .............. H04W 24/08
9,621,470 B2* 4/2017 Starsinic ................ H04W 4/70
(Continued)

FOREIGN PATENT DOCUMENTS

| WO | 2013116746 A1 | 8/2013 |
|---|---|---|
| WO | 2014058369 A1 | 4/2014 |
| WO | 2015124210 A1 | 8/2015 |

OTHER PUBLICATIONS

International Search Report dated Jun. 16, 2017 for corresponding International Application No. PCT/CN2017/083995 filed May 11, 2017.

*Primary Examiner* — Mohamed A Kamara

(57) ABSTRACT

The present application provides a channel type used to support user QoE expectations, which is, in particular, a QoS and QoE guaranteed channel (QQGC). Also provided is a related method and system for providing a QQGC. Effective bit rate (EBR), average bit rate, and maximum bit rate, are determined and used to support the channel. The EBR can be determined based on QoE reports. An application function, such as a network data analytics function provides the indication of effective bit rate. One or more portions of the application function can be provided in potentially different locations of a communications network and operatively coupled. Alternatively, application function portions can be co-located. The EBR is provided to and used by devices in the network to reserve user plane resources to support data flows at the EBR. The EBR can also be used for admission or rejection of requests for a QQGC channel.

21 Claims, 9 Drawing Sheets

(51) Int. Cl.
*H04L 1/00* (2006.01)
*H04L 12/26* (2006.01)
*H04L 12/825* (2013.01)
*H04L 12/863* (2013.01)
*H04W 72/08* (2009.01)
*H04L 12/24* (2006.01)

(52) U.S. Cl.
CPC ...... *H04L 41/5009* (2013.01); *H04L 41/5022* (2013.01); *H04L 41/5025* (2013.01); *H04L 43/103* (2013.01); *H04L 47/263* (2013.01); *H04L 47/6215* (2013.01); *H04W 72/087* (2013.01)

(58) Field of Classification Search
CPC . H04L 43/103; H04L 47/263; H04L 47/6215; H04W 28/22; H04W 72/087
See application file for complete search history.

(56) References Cited

U.S. PATENT DOCUMENTS

| | | | |
|---|---|---|---|
| 2012/0311126 A1* | 12/2012 | Jadallah | H04L 41/5067 709/224 |
| 2014/0269269 A1 | 9/2014 | Kovvali et al. | |
| 2015/0131545 A1* | 5/2015 | Ameigeiras Gutierrez | H04W 72/087 370/329 |
| 2018/0109468 A1* | 4/2018 | Sridhar | H04L 5/006 |

\* cited by examiner

METHOD AND SYSTEM FOR PROVIDING GUARANTEED QUALITY OF SERVICE AND QUALITY OF EXPERIENCE CHANNEL

CROSS-REFERENCE TO RELATED APPLICATIONS

This application claims the benefit of priority to U.S. Provisional Patent Application No. 62/336,327 filed May 13, 2016, the contents of which are incorporated herein by reference in their entirety.

FIELD OF THE INVENTION

The present invention pertains to the field of communication networks and in particular to a QoS and QoE guaranteed channel within a network, and the related method and system for providing such a channel.

BACKGROUND

In mobile communication networks, it is known to direct data traffic of a certain type (e.g. related to a specific service or application) over a corresponding bearer. In this respect, a bearer is considered to be an information transmission context or path of defined characteristics, e.g., capacity, delay and/or bit error rate. The defined characteristics of a bearer dictate how nodes handling bearer traffic prioritize and allocate resources. The establishment of a bearer having defined characteristics allows a network to ensure that a traffic flow can be provided a desired quality of service (QoS). Conventionally, bearers are used for prioritized traffic (e.g., traffic with a QoS requirement) which is provided a guaranteed bit rate (GBR). Bearers used to carry so-called "best effort" traffic, referred to as non-GBR bearers, do not have a guaranteed bit rate for transmitting the data traffic.

In the Third Generation (3G) and Fourth Generation (4G) mobile networks, the guaranteed bit rate (GBR) bearer is used to support applications requiring certain relatively high quality of service (QoS) criteria. For example, real-time voice and video telephony services require low packet delay of 100 ms or 150 ms, but can accept a certain rate of packet loss. Using the required characteristics, a GBR bearer can be defined for the real-time flows. When the system receives a GBR service request, the admission control function of the network checks available resources in the radio access network (RAN) and possibly also in core network (CN). If the available resources are enough to support the GBR service request, the service will be admitted. Otherwise, the service request will be rejected.

GBR Bearers are used to carry real time traffic in many 3G/4G Radio Access Networks. Although they may be suitable for some types of real time traffic, they are often used because there are no better alternatives. GBR bearers are suitable for traffic flows that have relatively constant bandwidth profiles because they require a dedication of bandwidth. GBR bearers are somewhat inefficient in terms of bandwidth usage for traffic flows that have high variance in bandwidth consumption. Real-time video delivery (e.g., for video calling, etc.) is one such example of a traffic flow with highly variable demands.

In the future, it is likely that there will be more demand for services that conform to stringent QoS/QoE requirements. Such services can include, for example, remote healthcare, virtual-reality, and high quality video conferencing (HD/4K/8K/3D). Therefore it is desirable to provide a network capable of efficiently supporting these and other services. For example, it is desirable to provide a network capable of supporting the maximum bit rate (MBR) of real-time video flows and provide a GBR without the need to over-provision the network.

This background information is provided to reveal information believed by the applicant to be of possible relevance to the present invention. No admission is necessarily intended, nor should be construed, that any of the preceding information constitutes prior art against the present invention.

SUMMARY

In accordance with embodiments of the present disclosure, there is provided a type of channel used to support actual user QoE expectations, in particular, there is provided a QoS and QoE guaranteed channel (QQGC).

In accordance with embodiments of the present disclosure, there is provided a system for providing a QoS and QoE guaranteed channel (QQGC) in a mobile communications network, comprising: a radio access network (RAN) operative to receive wireless communications from a plurality of UEs; a control plane of the network including control plane functions operative to control operations of the mobile communications network and to receive from one of the UEs a request for a QQGC session to a service offered by an application server available on the mobile communications network; an application function of the control plane functions interactive with the control plane functions and presenting an interface to the plurality of UEs and the application server, and the application function operative to receive from the UE and the application server QoE reports relating to the QQGC session and to forward to the control plane functions a perceived EBR based on the received QoE reports; user plane (UP) functions comprising a UP QoS and Rate Control function operative to evaluate ABR and MBR on the service established between the UE and the application server; the radio access network (RAN) comprising a RAN QoS and Rate Control function operative to evaluate ABR and MBR on the service established between the UE and the application server; wherein the control plane functions are operative to: receive the perceived effective bit rate (EBR) and to forward to the user plane functions and the RAN updated QQGC parameters based on the perceived EBR.

In accordance with further embodiments of the disclosure, there is provided a method for establishing a QQGC across one or more networks comprising a control plane (CP) function of the one or more networks, said method comprising: receiving a request for a QQGC session from a UE to connect to an application server providing a service on the one or more networks; evaluating the request to determine a suitable data path from the UE through a RAN and UP of a CN of the one or more networks to the service; sending session information comprising an EBR for the service to an admission control of the RAN and to UP functions of the CN; receiving from the admission control and the UP functions an estimate of available resources to meet the EBR for the service; and when the estimate of available resources can satisfy the EBR, admitting the session request, and when the estimate of available resources cannot satisfy the EBR, terminating the session request.

In some implementations, the admitting the session request comprises sending a session confirmation to the UE and instructing the admission control and the UP functions to establish the QQGC.

In some implementations, the method further comprises an application function of the CP function: receiving a QoE report relating to the QQGC from at least one of the UE and the application server; deriving a user perceived QoE level based upon the QoE report; estimating a dynamic EBR based upon the derived QoE level; and when the dynamic EBR is different from the EBR (which may be a statistical EBR), providing an updated EBR to the admission control and the UP functions to update the QQGC parameters including EBR and flow priority.

In accordance with further embodiments of the disclosure, there is provided an Application Function (AF), instantiated within a core network, either in the control plane or management plane, of a mobile network operator (MNO) or outside the core network but within a domain of an MNO. In some embodiments, the AF can be located in a different domain outside the domain of the MNO. The domain where the AF is instantiated can be a trusted or a non-trusted domain of the MNO. In a further embodiment, the AF can be instantiated in an Application Server (AS). The AF may be a network data analytics (NWDA) function. In some embodiments, the AF can be located in the access network (e.g. radio access network) portion of the communication network. The AF is for receiving traffic flow parameters from an entity outside the core network, the AF comprising: a processor operatively connected to a memory storing instruction that when executed by the processor cause the AF to: transmit instructions to a network controller to create a channel in a user plane between the entity outside the core network and a UE connected to a Radio Access Network associated with the core network, the channel provisioned in accordance with an Average Bit Rate, a Maximum Bit Rate and an Effective Bit Rate that allow the network controller to multiplex a plurality of such channels.

In some embodiments, multiple differently located components can be provided and configured to operate together. For example, one or more application function portions and one or more application server portions can be provided in potentially different locations and operatively coupled together. The application server portion(s) can be configured to receive quality of experience reports indicative of the quality parameters and to forward aggregate information indicative of the quality parameters to the application function portion(s). The application function portion(s) can be configured to determine the effective bit rate based on the received aggregate information. A function receiving QoE reports and a function estimating EBR can be located or collocated in the (R)AN, in the core network, outside the core network, in a trusted domain outside core network, or in a non-trusted domain outside core network.

In accordance with embodiments of the present disclosure there is provided an apparatus for use with a communication network, comprising a network interface configured to transmit and receive control plane messages and processing circuitry. The apparatus is configured to receive quality parameters using the network interface, the quality parameters indicative of a quality of experience level measured in association with delivery of a service to the UE via the communication network during a prior period. The apparatus is further configured to transmit a control plane message using the network interface, the control plane message indicative of an effective bit rate which is determined at the apparatus based on the quality parameters, wherein the effective bit rate is a communication network user plane bit rate which, when used in delivery of the service, is expected to result in a desired quality of experience level of the service. The effective bit rate conveyed via the control plane message is used by one or more devices in the communication network to adjust network operations associated with delivery of the service, wherein adjusting network operations comprises reserving sufficient user plane resources to support the effective bit rate.

In accordance with embodiments of the present disclosure there is provided an apparatus for use with a communication network, comprising a network interface configured to transmit and receive control plane messages and processing circuitry. The apparatus is configured to receive a request message using the network interface, the request message including a request to support delivery of a service to a UE via the communication network and at a desired quality of experience level. The apparatus is further configured to transmit a control plane message using the network interface, the control plane message indicative of an effective bit rate, wherein the effective bit rate is a communication network user plane bit rate which, when used in delivery of the service, is expected to result in the desired quality of experience level for the service. The control plane message is used for admitting or rejecting the request.

In accordance with embodiments of the present disclosure there is provided a communication network comprising a core network portion and a radio access network portion, the communication network comprising one or more control plane networked computing devices. The devices are configured to provide a quality-guaranteed communication channel for conveying a user plane data flow to or from a user equipment (UE), the channel being characterized by an effective bit rate, an average bit rate, and a maximum bit rate. The effective bit rate is provided using an apparatus as already described above.

In accordance with embodiments of the present disclosure there is provided a method for supporting operation of a communication network, the method performed by a networked computing device communicatively coupled to the communication network. The method includes receiving quality parameters using a network interface, the quality parameters indicative of a quality of experience level measured in association with delivery of a service to the UE via the communication network during a prior period. The method also includes transmitting a control plane message using the network interface, the control plane message indicative of an effective bit rate which is determined at the computing device based on the quality parameters, wherein the effective bit rate is a communication network user plane bit rate which, when used in delivery of the service, is expected to result in a desired quality of experience level of the service. The effective bit rate conveyed via the control plane message is used by one or more devices in the communication network to adjust network operations associated with delivery of the service, wherein adjusting network operations comprises reserving sufficient user plane resources to support the effective bit rate.

In accordance with embodiments of the present disclosure there is provided a method for supporting operation of a communication network, the method performed by a networked computing device communicatively coupled to the communication network. The method includes receiving a request message using a network interface, the request message including a request to support delivery of a service to a UE via the communication network and at a desired quality of experience level. The method further includes transmitting a control plane message using the network interface, the control plane message indicative of an effective bit rate, wherein the effective bit rate is a communication network user plane bit rate which, when used in delivery of the service, is expected to result in the desired quality of experience level for the service. The control plane message is used for admitting or rejecting the request.

In accordance with embodiments of the present disclosure there is provided a method of operating a communication network comprising a core network portion and a radio access network portion, the method performed by one or more control plane networked computing devices. The method includes providing a quality-guaranteed communication channel for conveying a user plane data flow to or from a user equipment (UE), the channel being characterized by an effective bit rate, an average bit rate, and a maximum bit rate. The effective bit rate is provided using another method as described above.

BRIEF DESCRIPTION OF THE FIGURES

Further features and advantages of the present disclosure will become apparent from the following detailed description, taken in combination with the appended drawing, in which.

DETAILED DESCRIPTION

Figure 1:
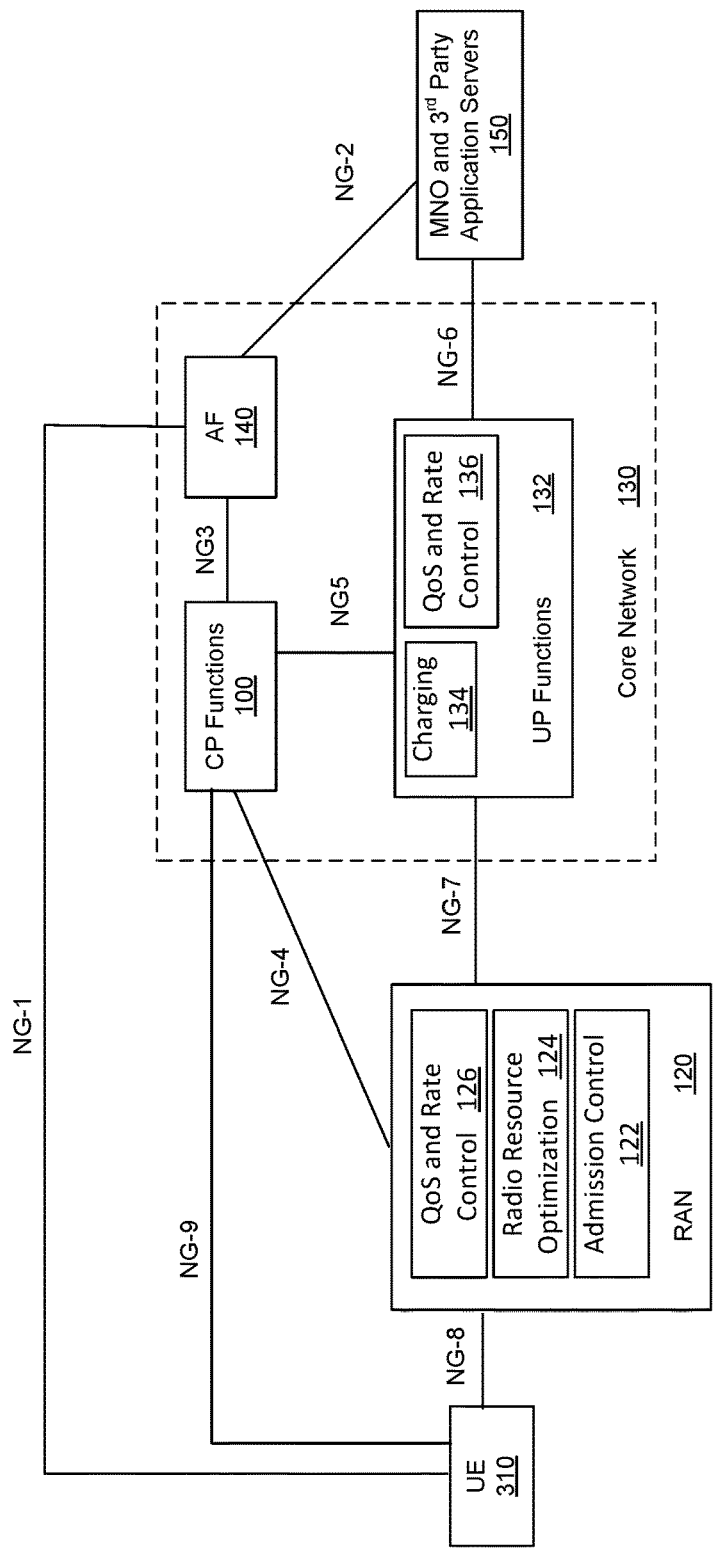
FIG. 1 is a network block diagram illustrating one embodiment of the use of a QQGC.

Various acronyms as used herein are defined in the following non-exhaustive list:
AN: Access Network
ARP: Allocation and Retention Priority.
CN: Core Network
CP: Control Plane
GW: Gateway
MM: Mobility Management
MNO: Mobile Network Operator
NS: Network Slice
QoE: Quality of Experience
QoS: Quality of Service
QCI: QoS Control Indicator
RAN: Radio Access Network
RRO: Radio Resource Optimization
UE: User Equipment
UP: User Plane Unless defined otherwise, all technical and scientific terms used herein have the same meaning as commonly understood by one of ordinary skill in the art to which this disclosure belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or ingredient(s) as appropriate.

As used herein, references to "TS" documents such as TS 23.501 (e.g., version 0.4.0) and TS 23.502 (e.g., version 0.3.0) are references to $3^{rd}$ Generation Partnership Project (3GPP) technical specification standards documents, which are published by the 3GPP.

Designations used herein, such as network interfaces, beginning with the letters "NG" (e.g. NG3, NG5, etc.) refer to designations specified in accordance with the 3GPP, as would be readily understood by a worker skilled in the art. It should be understood that described network components or features corresponding to such "NG" designations can be replaced with comparable network components or features. For example, 3GPP specifications for $5^{th}$ generation (5G) networks refer to interfaces such as N1, N2, etc., and "NGx" interfaces can be replaced with the appropriate corresponding "Ny" interfaces. The numbering of such "Ny" interfaces does not necessarily correspond to the numbering of "NGx" interfaces. Variations in naming conventions between different wireless communication standards (e.g. between LTE and 5G) will be readily understood by a worker skilled in the art.

As used herein, a "network" or "communication network" may service various devices including but not necessarily limited to wireless devices. Such a network may include a radio access portion and a backhaul portion. The network may further comprise various virtualized components as will become readily apparent herein. A primary forward looking example of such a network is a Fifth Generation (5G) network. It has been proposed that 5G networks be built with various network technologies that allow for the network to be reconfigured to suit various different needs. These technologies can also allow the network to support network slicing to create isolated sub-networks with characteristics suited for the needs of the traffic that they are designed to support. The network may include a number of computing hardware resources that provide processors, memory, and storage to functions executing on the network, as well as a variety of different network connectivity options connecting the computing resources to each other, and making it possible to provide service to mobile devices. A mobile device need not be mobile itself, but instead it is a device that can be connected to the network using connections that are aimed at providing mobility. One example of a mobile device is the User Equipment (UE) as defined by the 3GPP, which may include both handsets and other devices, including Machine-to-Machine (m2m) devices (also referred to as Machine Type Communications (MTC) devices) or electronic devices (ED).

A GBR bearer is a type of Evolved Packet System (EPS) bearer. A GBR bearer is an EPS bearer that has a Guaranteed Bit Rate (GBR) allocated to it. The GBR assignment is typically made by an admission control function, which may be instantiated within an eNodeB during the bearer establishment/modification procedure. EPS bearers without an assigned GBR are referred to as a Non-GBR bearers, or best-effort bearers. Note that admission control can be performed at establishment/modification of a Non-GBR bearer even though a Non-GBR bearer is not associated with a GBR value.

A dedicated bearer can be either a GBR or a Non-GBR bearer. A default bearer is typically a Non-GBR bearer. A default bearer provides the UE with IP connectivity throughout the lifetime of the Packet Data Network (PDN) connection. In many implementations, non-GBR bearers are created far more frequently than GBR bearers, which motivates the setting of a default bearer to bearer type Non-GBR.

The EPS bearer QoS profile typically includes QCI, ARP, GBR and MBR, parameters as described below. Also described below are QoS parameters that are applied to an aggregated set of EPS Bearers: APN AMBR and UE AMBR.

An EPS bearer, whether it is a GBR or a non-GBR bearer, is associated with the following bearer level QoS parameters:

QoS Class Identifier (QCI);
Allocation and Retention Priority (ARP).
Guaranteed Bit Rate (GBR); and
Maximum Bit Rate (MBR).

A QCI is a scalar value that is used as a reference to node specific parameters that control bearer level packet forwarding treatment (e.g., scheduling weights, admission thresholds, queue management thresholds, link layer protocol configuration, etc.), and that have been pre-configured by the operator owning the access node (e.g., eNodeB). A one-to-one mapping of standardized QCI values to standardized characteristics is captured in TS 23.203 [3GPP TS 23.203, "Policy and Charging Control Architecture"]. It will be understood that the QCI is often used exclusively with access nodes, and nodes in an access network, but it can be used in a core network as well.

The ARP typically contains information about the priority level (scalar), the pre-emption capability (flag) and the pre-emption vulnerability (flag). The primary purpose of ARP is to decide whether a bearer establishment/modification request can be accepted or is to be rejected due to resource limitations (typically available radio capacity for GBR bearers). The priority level information of the ARP is used for this decision so that the request of the bearer with the higher priority level is preferred. In addition, the ARP can be used (e.g., by the eNodeB) to decide which bearer(s) to drop during exceptional resource limitations (e.g. at handover). The pre-emption capability information of the ARP defines whether a bearer with a lower ARP priority level should be dropped to free up the required resources. The pre-emption vulnerability information of the ARP defines whether a bearer is applicable for such dropping by a pre-emption capable bearer with a higher ARP priority value. Once successfully established, a bearer's ARP typically will not have any impact on the bearer level packet forwarding treatment (e.g., scheduling and rate control). Such packet forwarding treatment should be solely determined by the other EPS bearer QoS parameters: QCI, GBR and MBR, and by the AMBR parameters. The ARP is not included within the EPS QoS Profile sent to the UE.

The GBR denotes the bit rate that can be expected to be provided by a GBR bearer. The MBR limits the bit rate that can be expected to be provided by a GBR bearer (e.g., excess traffic may get discarded by a rate shaping function).

Minimum GBR bearers are typically used for applications like Voice over Internet Protocol (VoIP), with an associated GBR value; higher bit rates can be allowed if resources are available. Non-GBR bearers do not guarantee any particular bit rate, and are typically used for applications, such as web-browsing. This GBR parameter does not provide any information about the nature of the traffic. For example, for voice services, the short-term bit rate can be zero when there is no voice traffic being generated by the UE (e.g. when users are not talking).

The term "GBR traffic" is used herein to refer to traffic that is traditionally first subject to admission control, after which it is handled in a way that guarantees no congestion related packet drops will occur under any system load, provided that the offered traffic remains within its GBR envelope.

The parameters of a GBR bearer include: GBR, maximum guaranteed bit rate (MBR), packet delay budget (PDB) and packet loss rate (PLR). A GBR bearer can support a potentially large class of QoS-guaranteed traffic, where the explicit QoS parameters are notified by a UE or external application servers.

Voice and video are currently the two main services using GBR bearers. Because voice service has a low data rate, and the number of voice flows is much smaller than best effort traffic (e.g., web browsing, Over-the-top (OTT) non-real-time video services), mobile networks can support GBR bearers for voice calls. In contrast, real-time video service requires a higher data rate in comparison to voice services. Real-time video flows, in particular, may have high maximum bit rates, compared to the averaged rate, and they require the system to accommodate the maximum bit rate at the moment it is required, to maintain the real-time service. Therefore, if a system is dimensioned to support MBR of real-time video flows, that system will not be able to admit many video flows because the short-term MBR requirements dictate the size of the real-time channel that is on "standby" to accommodate the MBR transmission in real-time. Because a real-time video flow would require a GBR channel with a high MBR, the allocating resources to such a channel imposes a high cost to the network operator. The bandwidth dedicated to the session could be more profitably used for mobile broadband services (which are often charged based on transmitted bits). As the network is unable to fully make use of the channel, the cost of these sessions using a GBR bearer makes them prohibitively expensive for most consumers.

Consequently, it is difficult to implement a GBR bearer in many 3G/4G networks in an efficient manner. For example, as noted above, real-time video has a very high MBR (potentially several times higher than the average rate of video flows). If MBR is used for admission control, this can lead to inefficient radio resource utilization when reserved resources are not used by other flows or services of other UEs as they are held on standby to accommodate the MBR real-time video traffic.

Although support for GBR bearers is specified in some standards requirements, the number of GBR flows provisioned in current networks is typically quite small in comparison to other traffic flows. Accordingly, mobile network operators (MNO) may not recognize the need to support GBR bearer in future networks. The low incidence of GBR bearers is related to the difficulty and cost of establishing real-time video sessions. However, in the future, it is likely that there will be more services that require stringent QoS/QoE, such as, but not limited to, remote healthcare, virtual-reality, high quality video conferencing (HD/4K/8K/3D). Future 5G networks should be able to support these services, and others.

In a current version of 5G systems, the QoS parameters are specified in Section 5.7 TS 23.501 version 0.4.0, published in April 2017. The 5G QoS parameters are similar to those found in 4G systems described above. In 5G system, the QoS model is built around QoS flow based framework. Packets in a QoS flow are treated equally in 5G system. The 5G system also supports GBR and non-GBR flows.

In order to support GBR bearer, mobile networks may need to consider mobility and handover factors. With respect to mobility, when users are moving they may experience lower wireless channel capacity compared to the time the service is admitted to the network. Therefore, an MNO may need to reserve radio resources, for example spectrum, to handle mobility. Furthermore, when users are moving, users may move to a new area served by some other radio nodes. Therefore, not only the current serving cell(s) needs to reserve radio resources, but neighbor cells may also need to reserve radio resources in case of handover.

Considering real-time video flows, which typically have high maximum bit rate [Benny Bing, "Next-Generation Video Coding and Streaming", Wiley Publisher, 2015], if the system resources are reserved for maximum bit rate, then a significant amount of resource may be put aside. This may reduce the number of admitted video users, as well as wasting the unused resources reserved in neighbor cells in case of handover.

Therefore, it is difficult to support real-time video users, especially with mobility using a conventional GBR bearer concept of 3GPP.

In practice, wireless channel capacity can change quickly due to channel fading, path loss, mobility, network load, etc., and the data rate in the air interface for individual UEs can change over the time. Due to the physical reality of a changing channel, it may be important that applications have the capability to adapt to the wireless channel condition. Video codecs (e.g., ITU H.263/H.264/H.265) and audio codecs (e.g., high-definition AMR-WB voice codecs) can generate different bit rates when notified of changing channel conditions (typically by use of a feedback control channel) which indicates the supportable bit rate of the channel. As a result, it is possible for some applications to accommodate a reconfiguration of the parameters of GBR bearer (GBR/MBR) during the session. The actual supported bit rates can be changed over the time; but mobile networks may not be able to guarantee fixed GBR/MBR rates for a GBR bearer throughout the session. In discussing video delivery, it is important to understand that video compression typically makes use of different types of video frames. Some frames contain a full representation of the content of the screen. These frames are often referred to as I-frames. Other frames, such as p-frames, contain only the difference between the previous frame and the current frame. As a result, the size of p-frames is not constant but for many types of video content, they are considerably smaller than the I-frames. As a result, a video stream will have a large number of spikes (corresponding to I-frames) and then long periods of lower bandwidth traffic (corresponding to the p-frames). This highly variable traffic flow is difficult to provision for. Non-real time video streams may have the same structure, but because they are not-real time they can be buffered at the destination, and controlled at the source. This allows for their traffic to be paused, if the available bandwidth is not present, without the user noticing so long as a sufficient number of frames has been buffered at the destination. Because of the nature of a real time video flow, buffering is not a preferred option.

In mobile networks, congestion most commonly occurs in RAN. Therefore, the admission control is required in RAN. Additionally, when congestion happens, a radio resource optimization (RRO) function will be triggered to reconfigure the transmission parameters of radio nodes as well as to change the UE cell association. In another example, RRO is triggered in order to conserve energy, for example, some radio nodes can be turned off where the network load is low.

For both admission control and RRO functions, the GBR and MBR rates may not be useful. If the GBR rate parameter is used: more flows are admitted and congestion can happen because the MBR is not considered. On the other hand, if the MBR parameter is used then fewer flows are admitted and the system resources can be underutilized if the reserved resources for MBR rate of GBR flows are not used by other flows running on non-GBR bearers.

Efforts have been made to map QoS parameters of the physical layer to the user layer QoE, to determine if QoS parameters of GBR bearers are useful to accurately predict user QoE. QoE can refer to QoS aspects for popular services in mobile networks. Results suggest that QoS parameters are useful to a certain degree, but cannot provide sufficient information to derive an accurate QoE level. For example, there is a certain packet loss rate in the air interface. Considering real-time video, if the lost packets are part of an important I-frame, the quality of video decoding will be degraded for this I-frame and also for subsequent, dependent P-frames of the same group of pictures, which lasts one or a few seconds (depending on the periodicity of I-frames). For this reason the application layer reports the QoE parameters (service interruption time for example) to application server periodically.

In summary, the current parameters (GBR and MBR rates) of GBR bearer are inefficient mechanisms for handling real-time video. Accordingly, although they may be the best available option for MNOs to manage their network functions to handle real-time video/voice services, they are still suboptimal.

QoS and QoE Guaranteed Channel

To address the need to support services that require stringent QoS/QoE guarantees, a new type of channel is provided herein to support actual user QoE expectations. In particular, embodiments of the present disclosure provide for a QoS and QoE, or quality, guaranteed channel (QQGC).

Embodiments of the present disclosure provide for a quality-guaranteed communication channel (e.g. QQGC) to carry data flows, such as video, audio, live or time-sensitive data flows, or other types of data, the channel being characterized at least by an effective bit rate (EBR), an average bit rate (ABR) and a maximum bit rate (MBR). The EBR can be derived based on QoE feedback as described elsewhere herein. The ABR and the MBR can be specified for particular applications, video codecs, etc. As such, ABR and MBR can be determined based on parameters of the service request, such as type of service. The ABR and MBR can also be measured by appropriate network entities, for example by monitoring the traffic flows at one or more network nodes. A channel which is characterized at least by EBR, ABR, and MBR may be a channel which substantially guarantees a QoE that can be supported using the EBR, and which is constrained so that data flows thereof substantially respect the ABR and MBR. QoS and data flow control can be used to enforce such constraints. EBR can be used by management entities for admission control, radio resource allocation, etc. ABR and MBR can be provided as input to policy enforcement and/or charging entities for example in the radio access network (e.g. base station/eNB/gNB) and core network (e.g. UPF, P-GW).

Embodiments of the present disclosure provide for a method and apparatus for controlling admission or rejection of a request to establish a quality-guaranteed communication channel, the admission or rejection decision being based on a statistical measure of EBR. For example, an initial estimate of EBR can be generated based on available information, such as ABR and/or MBR. EBR estimates can be based on historical data, network modelling and simulation, empirical or analytic functions, etc.

In various embodiments, in relation to admission control, a request message is received using a network interface. The request message includes a request to support delivery of a service to a UE via the communication network and at a desired quality of experience level. Subsequently, a control plane message is transmitted using the network interface. The control plane message is indicative of an effective bit rate.

As used herein, the term "Effective Bit Rate" or "EBR", refers to a variable bit rate that can be used by management entities to allocate resources to the data flow to provide an acceptable QoE level. The EBR can be defined as a data rate that the system should be provisioned (and in some cases dynamically provisioned) to maintain an acceptable QoE level for end user applications.

In one example, during real-time video sessions, the required EBR may be dynamically estimated by monitoring the QoE feedback parameters. The CP functions of the Core Network can estimate the effective rate. The EBR can be adjusted to achieve a QoE target level defined by mobile network operators. For example, if the long-term QoE level of a user application is above a threshold, the EBR can be reduced to improve the resource utilization. If the QoE level is dropped below another threshold, the EBR should be increased.

The EBR can be used for functions performed in the RAN (e.g., admission control and on-the-fly radio resource management (RRM) functions) in the uplink and downlink directions. The admission control function can use a statistical EBR to make admission decision. Because the EBR is not higher than the maximum bit rate, the used of EBR will typically allow admission of more flows to the network. A statistical value of the EBR can be obtained based on the long-term data collection. The dynamic radio resource dimensioning can be made using the dynamic effective bit rate, which could be varied during the data session connection, instead of a fixed maximum bit rate parameter to avoid resource over provisioning. In some embodiments, for example when a dynamic EBR is not provided or not available, the same value of EBR can be used for both admission control and radio resource dimensioning. For example, a statistical value of EBR can be provided as input for resource allocation and/or resource reservation operations.

The EBR can be adjusted based on accumulated QoE reports. Unlike QoE reports, which could be sent from UE every few seconds (e.g., 2-10 seconds), the EBR can be adjusted on a longer time scale, for example every tens of seconds, for example, every 10, 30 seconds or longer, depending on the operator's QoE/QoS policy control in order to provide stable QoE levels to users. The EBR related to a channel can be provided one-time based on initial information. That is, the EBR can be static or semi-static. Alternatively, the EBR can be dynamic, and updated one or more times, for example periodically or in response to a trigger such as changing by a predetermined amount or crossing a threshold. In some embodiments, EBR can be updated on time scales of about every 30 seconds, 1 minute, or on a longer or shorter time scale.

The EBR concept for real-time video can be applied to other traffics having variable bit rates, such as voice telephony, and segmented video streaming, e.g., DASH-based video streaming, where users send requests to download video segment by segment.

The conventional GBR concept of 3GPP takes into account the characteristics of individual video (and voice/audio) flows in terms of GBR rate and MBR rate for resource reservation. Due to the nature of a real time video flow, it may be possible for an MNO to carry the real time flow and make use of traffic multiplexing gain to allow for more flows to be accommodated. For example, when two real-time video flows, each having the same peak rate of 20 Mbit/s and average rate of 5 Mbit/s, are sent over a single channel, the system does not necessarily need to reserve 2×20 Mbit/s=40 Mbit/s. If the peak rates of each flow (e.g. the location of the I-frames in the two flows) can be offset, the combined peak rate may be below 30 Mbit/s for example. Therefore, on average, it may only be necessary to reserve 15 Mbit/s of link capacity per video flow, which is 25% less than the peak rate of individual video flows. This rate of 15 Mbits/s is the effective bit rate (EBR).

In general, the greater the number of video flows, the lower the reserved bit rate per video flow required, due to multiplexing gains. Embodiments of the present disclosure provide for a method and apparatus for controlling radio resource assignment in support of a quality-guaranteed communication channel, the radio resource assignment being made based on current indications of EBR generated for the channel, for example based on QoE feedback. If QoE is below a threshold, additional radio resources can be assigned to support higher EBR of the communication channel, while if QoE is above another higher threshold, the amount of radio resources currently used in supporting EBR of the communication channel can be decreased. Other network resources, prioritizations etc. can similarly be adjusted based on EBR.

In various embodiments, in relation to resource allocation, quality parameters are received using a network interface. The quality parameters are indicative of a quality of experience level measured in association with delivery of a service to the UE via the communication network during a prior period. Subsequently, a control plane message is transmitted using the network interface. The control plane message is indicative of an effective bit rate which is determined at the apparatus based on the quality parameters. The effective bit rate conveyed via the control plane message is used by one or more devices in the communication network to adjust network operations associated with delivery of the service, such that the bandwidth reserved for the service is equal to or greater than the effective bit rate.

An apparatus provided according to various embodiments can be a networked computing device including a network interface configured to transmit and receive control plane messages and processing circuitry. The apparatus may reside in or be communicatively coupled to a control plane of the communication network, and may be provided as a dedicated device or as a function of a device which may also host other functions. Methods as described herein can similarly be performed by such an apparatus.

In various embodiments, the quality parameters are provided by the apparatus which generates the EBR indications or by another apparatus communicatively coupled to the apparatus which generates the EBR indication.

In some embodiments, determining the effective bit rate based on the quality parameters is performed by: determining an observed quality of experience level based on the quality parameters; determining a prior effective bit rate which was specified for the prior period; setting the effective bit rate at a value which is higher than the prior effective bit rate when the observed quality of experience level is lower than a range encompassing the desired quality of experience level; and setting the effective bit rate at a value which is lower than the prior effective bit rate when the observed quality of experience level is higher than the range encompassing the desired quality of experience level.

In various embodiments, QoS and/or rate control functions pertaining to a quality-guaranteed communication channel operate based on ABR and MBR measurements obtained in relation to the channel. As such, QoS and data rates can be adjusted based on these ABR and MBR measurements, and potentially also EBR measurements.

Embodiments of the present disclosure provide for the mapping of EBR, ABR, and MBR indications and/or measurements to support data flows such as existing data flows, GBR flows, non-GBR flows, data flows carrying voice data flows carrying video, or a combination thereof. These indications and/or measurements are generally used for admission control, resource allocation, etc. in order to provide an adequate level of QoE for data flows, based on the requirements of such data flows and/or users. Mapping of such indications and/or measurements can comprise utilizing EBR to allocate sufficient resources to support an adequate QoE the data flow, and/or controlling the data flow so that it substantially respects limits on ABR and MBR.

In various embodiments, EBR is determined using a function which resides internally to the core network. For example, the function can be a Network Data Analytic (NWDA) function of a 5G communication network. NWDA is described for example in the 3GPP documents TS 23.501, Version 0.4.0, April 2017, and TS 23.502, Version 0.3.0, March 2017. NWDA may refer to an operator managed analytics providing slice-specific network data analytics. In various embodiments, EBR is determined using a function which lies outside of the core network, such as an external application server or application function. The function receiving QoE feedback and the function determining EBR may be separate or collocated. QoE feedback may be sent to one or more application servers which aggregate QoE reports and forward (the aggregate information) to another application function which determines EBR. EBR can be determined based on the QoE feedback. In some embodiments, parameters generated by the function, such as EBR, can be passed to the PCF.

In various embodiments, the quality parameters are provided in the form of quality of experience reports from one or both of: the UE; and an application server providing the service to the UE.

In various embodiments, the effective bit rate is based partially on a traffic type used in supporting the service. In some embodiments, the effective bit rate is determined based on the quality parameters and further is determined based at least partially on current network loading conditions.

In some embodiments, the reserved resources of the communication network (i.e. reserved by control plane messaging for supporting delivery of the service at the desired QoE) are used to provision a channel supporting delivery of the service, the channel further being provisioned and monitored in accordance with an average bit rate and a maximum bit rate.

In some embodiments, admitting or rejecting the request comprises admitting the request when the effective bit rate can be supported by radio access network and core network user plane portions of the wireless communication network, and rejecting the request otherwise.

Some embodiments of the present invention provide for a communication network comprising a core network portion and a radio access network portion. The communication network includes one or more control plane networked computing devices. The devices are configured to provide a quality-guaranteed communication channel for conveying a user plane data flow to or from a user equipment (UE), the channel being characterized at least by an effective bit rate, an average bit rate, and a maximum bit rate. The effective bit rate can be provided by another apparatus for example as described above. In some embodiments, the effective bit rate, the average bit rate, and the maximum bit rate are mapped to support the user plane data flow. In some embodiments, the user plane data flow is a guaranteed bit rate data flow, a non-guaranteed bit rate data flow, a data flow carrying voice information, or a data flow carrying video information.

The herein described QQGC employs meaningful parameters to handle traffic that requires guaranteed service, such as real-time video flows, which have much larger bandwidth and also large peak-to-mean rate ratio in comparison to non-real-time (or buffered) video flows. This channel model can also be extended to support other traffic, and is not limited to real-time video flow.

In practice, wireless channel capacities for individual UEs differ due to path loss, shadowing, and several other factors, including, for example, variable bit rate nature of video coding. It is difficult to quantify how much of a system resource, such as spectrum allocations, should be reserved for video flows. One mechanism for estimating the effective bit rate of service flows, such as real-time video flows, uses the Quality of Experience (QoE) report. For real-time video, the QoE report includes information such as, for example, "total interruption time" (i.e., the time that no video is displayed), and "number of interruptions." From QoE parameters, a mean opinion score (MOS) can be derived. There are many methods to map the QoE parameters to the MOS [European Telecommunications Standards Institute (ETSI), Technical Report 102 643, "Human Factors: Quality of Experience (QoE) requirements for real-time communication services", December 2009].

In one example, if the target QoE is within the range [3.5, 4.5] on a scale from 1 to 5, a statistical value of effective bit rate can be used to make an admission control decision. The statistical effective bit rate is obtained based on system simulations, or based on real network measurements, theoretical calculation, statistical models, etc. or combinations thereof. After the UE session is admitted, depending on the video encoding characteristics (peak-to-mean rate), decoder capability (error concealment techniques), nature of video, end-to-end channel characteristics (packet delay, packet drop rate, jitter, etc.), and presence of other data flows, the application layer of the UE can report QoE metrics back to an Application Function (AF). Optionally, the AF is a function (e.g., Network Data Analytics (NWDA)) of the control plane (CP) or another data analytics functions of network management plane of the mobile network (see FIG. 1). The AF may reside in the core network portion of the mobile network. Alternatively, the AF is a function residing outside the CP, such as defined for example in TS 23.501). The AF may be within a trusted domain or a non-trusted domain outside of the CP.

In one embodiment, the AF can derive the real-time QoE level of running applications; if the QoE level is below a preselected or predetermined threshold, the EBR associated with video flows can be increased and if the QoE level is higher than another preselected or predetermined threshold, the EBR can be reduced. This embodiment provides an adaptive EBR adjustment from a continuous feedback loop where allocated EBR is adjusted based on measured QoE.

For example, in some embodiments, when a previous control plane message indicative of a previous effective bit rate has been transmitted and the current quality parameters correspond to a QoE that is lower than a predetermined threshold, the effective bit rate can be adjusted upward to a value greater than the previous effective bit rate. The threshold may be derived from the desired quality of experience level. Additionally or alternatively, when the current quality parameters correspond to a QoE that is higher than another predetermined threshold, the effective bit rate can be adjusted downward to a value which is less than the previous effective bit rate. Thus, a feedback loop can be maintained for adjusting EBR based on QoE, in order to maintain QoE in a target region defined for example by thresholds. The target region can be defined for example as the target QoE plus or minus a given percentage, or the target QoE plus or minus a given amount.

The EBR can be used as one of the input parameters for system resource management functions, such as RRO in radio access network (RAN), user plane path selections, and resources (e.g., computing, in-network storage) selection in RAN and CN. For example, during the Session Establishment procedure in 5G system, the Policy Control Function (PCF) may already have statistical EBR from the AF (such as NWDA function). The PCF may inform the SMF the statistical EBR, then the SMF may inform the RAN the statistical EBR, in additional to ABR and MBR, for admission control purpose. The SMF may also use the statistical EBR, in additional to ABR and MBR to select a UPF to serve the PDU session.

In summary, rate parameters associated with services that require stringent QoS/QoE guarantees, for example, real-time video flows, include:
  Average bit rate (ABR): target long-term bit rate of video, specified by video application.
  Maximum bit rate (MBR): peak rate of video frames, specified by video codec design.
  Effective bit rate (EBR): a variable bit rate that can be used by management entities to allocate resources to the flow to provide an acceptable QoE level. In other words, EBR is an abstract bit rate that can be used to represent system imperfections (e.g., video encoder/decoder, packet loss and delay during transmission) corresponding to a certain range of QoE. The EBR can be used to account for a variety of different impacts to the system attributable to video content (e.g., slow motion vs. fast motion, detailed vs. coarse texture), video encoder (e.g. peak rate limit), video decoder (e.g. error concealment), video resolution and features (SD/HD/2K/4K/8K/3D), end-to-end channel characteristics, types of video services (e.g. TV, video conferencing, virtual-reality, remote healthcare surgery, remote surveillance), and user perception of the quality of video displayed at the user's device.

Making use of the EBR, a new channel, referred to herein as the QoS and QoE Guaranteed Channel (QQGC), can be defined. The QQGC can be used to carry guaranteed data traffic such as, but not necessarily limited to, real-time video flows. The QQGC has at least three parameters, ABR, MBR, and EBR, which are optionally combined with other existing parameters including, for example, CQI, ARP, packet loss rate (PLR), packet delay budget (PDB). The definitions of CQI, ARP, PLR, PDB follow [3GPP TS 23.401, Version 13.6.1, "General Packet Radio Service (GPRS) enhancements for E-UTRAN access", March 2016] and are provided above. Similar parameters are defined for 5G system in TS 23.501, Version 0.4.0, April 2017. However, the purpose of ABR, MBR, and EBR are different than the GBR and MBR of conventional GBR bearer concept. In the present system and method EBR is used for management entities (e.g., Admission control, RRO), and ABR and MBR are used for policy enforcement entities at the base station (e.g., gNB/eNB) and core network UP function (UPF, P-GW) to measure actual ABR and MBR of the PDU sessions and QoS data flows.

The QQGC generally operates as follows: the user plane (UP) policy and charging enforcement entity measures the ABR and MBR to make sure the bit rates of flows or services follow the agreed parameters when the system makes an admission control decision. When the system is congested, for example in RAN, or the load is very low, the RRM (Radio Resource Management) will optimize the RAN parameters (such as transmit power, spectrum allocation, number of antennas), by using the EBR (together with other QQGC parameters) for optimization. Further details of the operation of the system are provided below.

The following table provides a comparison between the herein provided QQGC channel and a GBR bearer. The parameters ABR, MBR, EBR can be assigned for individual QoS flows or multiple QoS flows of a PDU session.

| Network Function | GBR Bearer (GBR and MBR) | QQGC (ABR, MBR, EBR) |
|---|---|---|
| Admission Control | MBR or GBR | Statistical EBR |
| Radio Resource Optimization | GBR and MBR | Real-time (dynamic) EBR |
| QoS and Rate Control | GBR and MBR | ABR and MBR |

In relation to admission control, the (e.g. statistical) EBR can be based on quality parameters such as a desired QoE level. For example, input quality parameters can be used to derive EBR based on a relationship such as a numerical model of aspects of the communication network, simulation of aspects of the communication network, data indicative of aspects of the communication network observed during prior operation thereof, or a combination thereof. Additionally or alternatively, EBR can be determined based on one or a combination of: current network loading conditions; a traffic type of the service; an average bit rate expected for supporting delivery of the service; and a maximum bit rate expected for supporting delivery of the service.

Along with admission control, in some embodiments, resource reservation can be performed for supporting delivery of the service at the desired QoE level. The EBR can be transmitted to one or more entities responsible for resource reservation in the radio access network and/or core network.

Network Entities

Referring to FIG. 1, a block diagram is presented to illustrate an embodiment of a system comprising a QQGC employed with one or more application servers. Although the following discussion is specifically directed to real-time video flows, it should be understood that the same system and method is readily applied to other services.

CP Functions 100

CP functions 100 control the operation of mobile networks. CP functions 100 perform a new PDU (packet data unit) session setup when receiving requests from UE 110. CP functions 100 find suitable data path through RAN 120 and UP functions (UPF) 132 of CN 130, and then sends session information, including at least EBR to Admission Control 122 unit of RAN 120 and UP functions 132 of CN 130 to check available resources. If both RAN 120 and UP 132 of CN 130 can support EBR, the session request will be admitted. The full information of QQGC channel, if not already sent to RAN 120 and UP functions 132 during the session setup phase, will be sent to RAN 120 and UP functions 132 for charging and QoS and rate control.

Application Function (AF) 140

AF 140 is part of CP functions 100, such as Network Data Analytics (NWDA) of 5G system described in TS 23.501, Version 0.4.0, April 2017, illustrated separately to provide interfaces with UE 110 and Application Servers 150 (of MNO or third parties). More particularly, AF 140 functions to support communications between CP functions 100 and UE 110 and between UE 110 and Application Servers 150.

The main function of AF 140 is to collect the QoE report messages from either UE 110 (over NG-1) or from Application Servers 150 (NG-2).

In case the QoE reports are unavailable, the CP functions 100 will inform AF 140 (over NG-3) of the monitored QoS parameters (for example, data rate (such as 5G data rate parameters Guaranteed Flow Bit Rate (GFBR) and Maximum Flow Bit Rate (MFBR) of uplink and downlink), packet loss, and packet delay) of real-time video flows of users.

AF 140 will derive the user perceived QoE level for running applications, either based on QoE reports or monitored QoS information, or a combination thereof. The computation or method used to derive QoE level can be performed either by an internal function of AF 140 or by an external application function provided by Application Servers 150 (over NG-2) or by user's application rating feedback (over NG-1). The exact nature of the algorithm is not germane to the discussion.

AF 140 computes an EBR value for real-time video flows from newly computed QoE levels. For example, if the reported QoE parameters (such as, for example, total video interruption time) is poorer, the EBR needs to be increase, and vice versa. For real-time video, the effective rate is typically within a range bounded by the ABR and the MBR. The ABR and MBR can be set based on information provided by UE 110 or Application Server 150 to CP functions 100 during the session setup phase. For example, UE 110 informs CP functions 100, over the NG-9 interface, during the session setup phase the information to identify flows/services such as IP packet header information, type of services, ABR and MBR of video (and audio) codecs, together with, UE ID. Then CP functions 100 can inform AF 140 the type of service, ABR and MBR, and flow identification information over NG-3 interface. During the session, the ABR and MBR can be changed. The changes can be either requested by UE (if user preferences change) or by CP functions (if the network load is changed).

During the session, based on the QoE reports, the user QoE level and EBR will be updated. If EBR is changed, the AF 140 will send new EBR to CP functions 100 over NG-3 interface. CP functions 100 will instruct RAN 120 and UP functions 132 to update the parameters of QQGC, including EBR, and also flow priority.

UP Functions 132

UP functions 132 perform packet forwarding for the downlink stream received from application server 150 (over NG-6 interface). The received packets are forwarded to RAN 120 (over NG-7 interface). Additionally UP functions 132 can perform packet forwarding for uplink traffic in the reverse order.

The UP functions 132 include among other functions

Charging unit 134: This unit counts the number of bits of services to UE 110 and performs charging accordingly.

QoS and Rate Control 136: This unit performs packet marking and traffic shaping according to the ABR and MBR of QQRC channel.

For packet marking, the flow information given by UE 110 during the setup phase will be used to filter the packets. The packet marking information includes flow priority, which is part of the QCI field in current LTE system, or QoS Flow Identity (QFI) in 5G system, which can be attached to the packet. Alternatively, the flow priority is not attached to the packet, but is instead sent in a QoS rule to all the routers, such as 5G UPF functions via N4 interface of 5G system. In such a case, each router can be required to check the QoS flow identification information, such as 5-IP tuple, in packet headers and then map those fields to the flow priority level.

For Rate Control in the downlink and uplink, the aggregated ABR, such as per session aggregated maximum bit rate (Session-AMBR), and aggregated MBR of multiple services/flows should comply with the user SLA, such as 5G per UE Aggregate Maximum Bit Rate (UE-AMBR).

For uplink packets, the UP functions 132 can modify packet headers, including removing the flow priority label if it was attached to the packets, to make sure that the packet header format complied with protocols used outside the mobile network.

RAN 120

RAN 120 performs packet forwarding in the downlink received from CN 130 (over NG-7 interface) to UE 110 (over NG-8 interface), and packet forwarding in the uplink in the reverse direction. To fulfill this task, RAN 120 has Admission Control 122, which will check available resources to upon receiving session setup requests from CP functions 100 (over NG-4 interface). During the time of PDU sessions, the Radio Resource Optimization (RRO) 124 monitors resource usage in radio nodes. In the events of very high loads (congestion) and low load (resource under utilization), the RRO function 124 can be triggered to adjust and/or optimize radio resource allocation, by using the EBR as an input parameter at least, and also taking into account MBR and ABR. This may include adjusting network operations by adjusting an allocation of radio resources used in delivery of the service via a radio access network portion of the communication network. Adjusting network operations may include adjusting one or more of: an allocation of core network resources used in delivery of the service; prioritization of packets corresponding to delivery of the service; UE behaviour; and application server behaviour.

The QoS and Rate Control function 126 can perform packet marking for uplink flow, which apply flow priority maker to the packet header. For a downlink connection, if a UE has multiple connections to different core networks (e.g. over multiple NG-7 interfaces of the same CN or different CNs), the aggregated ABR and aggregated MBR of multiple flows/services are typically required to be in compliance with an SLA associated with the UE.

For the uplink, the QoS and Rate Control function 126 makes sure that the ABR and MBR in the uplink is complied with the ABR and MBR information obtained during session set up. Also the ABR and MBR must follow the user SLA (service-level agreement) constraints. Alternatively, a QoS and rate control function implemented in UE can perform the ABR and MBR check, and also to perform packet scheduling according to QoS policy.

In various embodiments, using the QoS and Rate Control function, network operations can be adjusted to cause the service to be delivered at an average bit rate that is within predetermined service parameters, or causing the service to be delivered at a maximum bit rate that is within predetermined service parameters, or both.

Signalling Messages

Signalling messages are carried over interfaces. Note that interfaces may be logical interfaces, although in simpler implementations they may be physical. For individual interfaces, there can be one or more physical interfaces implemented for information transfer.

Interface NG-9: Between UE and CP Functions

During a call set-up phase, UE sends information to identify flows (e.g. IP packet header fields, UE ID (subscriber number, or Temporary Mobile Subscriber Identity (TMSI), or International Mobile Subscriber Identity (IMSI)), type of services, optional relative priority of flows/services, ABR and MBR capability of codecs (video and audio). UE and CP functions may perform a QoS/QoE negotiation over NG-9. For example, if the RAN and UP of CN cannot support a certain high rate (ABR and MBR), some lower rates (ABR and MBR) can be supported.

During a session, if the initial requested ABR and MBR cannot be supported, CP and UE can negotiate lower data rates (ABR and MBR). Similarly, if the wireless channel becomes better, higher data rates can be supported, CP functions can inform UE the supportable ABR and MBR so that UE can select new codec parameters and sends the new codec parameters to CP functions. CP functions will inform AF, RAN and UP functions of CN about the new codec parameters Interface NG-1: Between UE and AF This interface conveys messages between UE and AF of CN.

Information transferred from UE to AF, is information used to identify flows (e.g., IP header fields, including IP addresses of source and destination, port numbers of source and destination, type of service, Differentiated Service Code Point (DSCP)) for traffic marker and classification. The QoE reports from UE, include:
information to identify data flows or UE ID
time of report,
duration of report,
type of service,
QoE parameters,
Optional QoE level (e.g. in a scale from 1 to 5), if the UE application has a function to map QoE parameters to QoE level, or the user can rate the service in real-time.

Information transferred between AF to UE may include new information, such as, but not limited to, incentives offered to users by MNO, and suggestions for content viewing during an on-going session.

Interface NG-2: Between Application Server and AF

The Application Server can inform AF of the mapping function between reported QoE parameters and QoE level. If the QoE report is not sent from UE to AF, but instead from UE to Application Server, the Application Server can either forward the QoE report to AF or send only the QoE level. It means that the Application Server will process the QoE report from UE to derive the QoE level and then informs AF of the QoE level.

The AF can inform Application Server of the QoE level and/or forward the QoE reports from UE, in case UE only reports the real-time QoE parameters to AF.

Mapping QQGC Parameters to Services

As noted above, the QQGC can be used for the provision of multimedia services. It is not limited to providing real-time video, although it is configured to meet the high stringency QoS and QoE required for providing real-time video while optimizing resource use.

In one non-limiting example, the QQGC is used to transmit real-time video service, in which case the following parameters are set:
ABR: the target long-term averaged bit rate of video service.
MBR: The maximum bit rate of video frames considering maximum end-to-end packet delay budget (BDB). This can be notified by UE or application server when the video services are initiated. The ratio of MBR and ABR should be standardized if the video services are provided by 3GPP or supported by 3GPP.
EBR:
For admission control: can be set based on a statistical number, for example 1.1 times ABR when there are 10 other video users sharing the same resources of one radio node; a CP function 100, such as PCF or SMF, may know how many video sessions currently served by a RAN node 120 and provides corresponding statistical EBR to the RAN node 120.
For admission control, if statistical EBR is unknown, EBR is set to be equal to MBR; The statistical EBR may be unknown if there are not enough QoE information to compute the EBR.
For RRO: the EBR is continuously calculated based on QoE reports from UE application, and other factors such as numbers of different data sessions, load condition in RAN node 120, etc.
PDB: as some ITU requirements, e.g. 150 ms; and
PLR: as some ITU requirements, e.g. 0.001.

In another non-limiting example, the QQGC is used to transmit real-time voice service, in which case the following parameters are set:
ABR: the output averaged bit rate of voice codec when users talk (on period);
MBR=ABR;
EBR:
If the statistical EBR is unknown, EBR can be set equal to ABR;
Dynamic EBR can be less than ABR due to on-off nature of voice traffic;
PDB: as some ITU requirements, e.g. 100 ms; and
PLR: as some ITU requirements, e.g. 0.001.

In another non-limiting example, the QQGC is used to transmit video/music voice services (e.g., DASH streaming). Note that in this example, these services are not real-time and the following parameters are set:
ABR: target averaged bit rate, informed by application (either UE or application server);
MBR: informed by video codec, if not available, set to default (e.g. 1.5 times the ABR);
EBR: initially set equal to ABR, can vary depending on video nature and video codec;
PDB: as some ITU requirements, e.g. 300 ms; and
PLR: as some ITU requirements, e.g. $10^{-6}$ packets per second.

In another non-limiting example, the QQGC is used to transmit generic unknown services requiring QoS (e.g., a leased line) for backward compatibility, in which case the following parameters are set:
ABR: minimum guaranteed bit rate;
MBR: maximum guaranteed bit rate;

EBR: void;
PDB: as some ITU requirements, e.g. 150 ms; and
PLR: as some ITU requirements, e.g. $10^{-6}$ packets per second.

In another non-limiting example, the QQGC is used to transmit generic web surfing services requiring QoS (e.g., downloading a movie), in which case the following parameters are set:
ABR: void;
MBR: void, or set to the value defined in service level agreement (SLA);
EBR: Rate specified by some user QoE definitions, e.g. average time to download a HD movie is 10 seconds;
PDB: as some ITU requirements, e.g. 300 ms; and
PLR: as some ITU requirements, e.g. $10^{-6}$ packets per second.

The QQGC described herein may benefit from standard changes. The effective rate of application can be estimated by using QoE feedback. If QoE feedback is not available, then the AF of CP can estimate the user QoE by mapping between QoS parameters and QoE level.

In certain embodiments, the QQGC is used to carry flows with required QoS/QoE support.

Content Requirement Aware QoS

The following discussion provides details of interfaces that may be used in providing a QQGC, as described above. The interfaces allow a UE and Application Servers to send QoE/QoS requests and to report QoE feedback parameters to an AF. The QoS parameter referred to herein as "EBR", represents a data rate for meeting users' QoE requests for services having varying bit rate, including, for example, real-time video services.

In TR 23.799, Section 5.2 "Key issue 2: QoS framework" [ETSI TR 102 643, "Human Factors (HF); Quality of Experience (QoE) requirements for real-time communication services", December 2009] it is stated that, "[s]olution for QoS framework enables optimal service level quality as per application needs, optimizing network capacity utilization."

5G systems may support a number of diversified real-time applications, including critical eHealth/mHealth, HD/4K/8K/3D video conferencing, 3D virtual-reality applications, gaming, mission critical communications, along with the delivery of non-real time data streams, such as, for example, Internet Protocol TeleVision (IPTV). Real-time video services require a low end-to-end packet delay budget, e.g. 100 ms. However, if a limited number of video packets do not get delivered, it may be possible for the packet loss to be compensated for by employing video concealment techniques at the video decoders. In current third and fourth generation (3G/4G) networks compliant with 3GPP standards [e.g., 3GPP TS 23.203, "Policy and charging control architecture"], the QCI for real-time video allows $10^{-3}$ packet loss rate. In practice, the error tolerance of different video codecs can be significantly varied, depending on video display resolution, robustness of video decoder, and the nature of video (e.g. fast or slow scene changes), among other factors. Therefore, the acceptable packet loss rate could be different for different video codecs and display resolution. Furthermore, video applications may have certain QoE requirements in addition to, or in place of the QoS requirements on traffic flow. The user perceived QoE is a function of QoS parameters. Because the QoS requirements define a level of service in a network connection, the QoS parameters alone may not give a direct indication of actual user perceived QoE. For example, a video stream that is interrupted by five delays spread through the duration of the stream, with each delay being a single second, may result in a user experience that is worse than a single 5 s delay at the start of the video. The QoS for such a connection may be the same. Additionally, the QoE will be a function not only of the QoS, but also of the video parameters. A video that experiences a number of delays may be a worse experience for a viewer than a smooth experience with a different resolution, or a different codec. Therefore, 3GPP video PSS and 3GP-DASH services support QoE reports [4] so that the actual QoE level can be derived reliably. Currently, there is no mechanism provided to support QoE report for OTT services.

In order to meet the QoE requirements of video services, the network may include a common framework allowing OTT services carried by the MNO to participate in the reporting of QoE measurements in real time. The QoE reports can be sent from any of: a UE, from an application server of MNO and from an application server of a third party. These QoE reports may be transmitted to a CP function. The CP function that receives a QoE report can process QoE report messages, provide a mapping between aggregated QoE reports and the required QoS parameter configuration. The QoS-to-QoE mapping can be built according to some standardized functions, or by vendor specific algorithms, or by instruction received from UE or Application Servers.

The QoE reports may be customized for different traffic types, including real-time and non-real-time video services. The QoE reports can include information that allows for identification of different traffic flows or different services (e.g., IP 5-tuple information, user subscriber number, Temporary Mobile Subscriber Identity (TMSI)), and application status (e.g., playout buffer size, service interruption time, and whether the application is background). QoE, and also EBR, can be determined based at least partially on traffic type.

The GBR and MBR QoS parameter may be used for radio resource management (RRM) and admission control for real-time video services. In video coding, the independently coded video frames (referred to as I-frames in MPEG encoding) are generated periodically. The I-frames are used to refresh video coding quality as well as to provide random access to recorded video files during play back. The size of I-frames is usually much larger than the other video dependent frames (e.g., predictive frames or P-frames). When being transmitted in real time and due to the packet delay constraint, the instantaneous peak bit rate of I-frames can be several times higher than the averaged bit rate of video flows. If some packets of an I-frame are lost, video decoders may be unable to decode this I-frame and other dependent P-frames, which may result in a video stall of one or several seconds. Alternatively, without being able to decode an I-frame of an in progress video stream may continue rendering using the "difference" information in a P-frame. However, complex changes (e.g. a scene change in a program) may result in very poor decoding quality. Therefore, the MBR may be set several times higher than the GBR as recommended. Consequently, the system resources are largely reserved to handle the MBR of real-time video flows.

In RAN, there are two typical scenarios that could trigger optimization of radio resources: determination that a particular cell or access node is overloaded and a determination that a particular cell or access node under loaded. In the cell overloaded scenario, the RRM is triggered to optimize the use or allocation of radio resources, such as transmit power and antennas. The RRM may also add more spectrum to overloaded cells. The usage of radio resources of neighbour cells surrounding overloaded cells should be also adjusted. In the cell under loaded scenario: network resources, such as, e.g., spectrum, transmit power, and allocated antennas can be reduced. The reduction in any or all of spectrum allocation, allocated antennas and transmit power may result in energy savings. Any or all of these reductions may also reduce interference to other cells. These reductions may aid in minimizing energy consumption in the operation of the overall network.

For admission control and RRM optimization, using the average bit rate (ABR) as an input to the admission control process may lead to a poor QoE because the high max bit rate of video flows may not be satisfied if congestion happens. With this realization, some designs may try to use a max rate as an input parameter so that adequate resources are reserved to handle the high peak rates of real-time video flows. Unfortunately, this reservation can lead to a waste of resources if the reserved resources are not used by other flows. Thus, neither the ABR nor the MBR may be an efficient value to use in representing real-time video requirements. Another bit rate within the range of mean rate and max rate should be used to make admission control decision and RRM for real-time video services; we call this rate the "effective bit rate". This term is defined above.

An EBR may be added as a QoS parameter to provide optimal service level quality as per application needs and to limit or minimize energy consumption in the overall network operation for real-time video flows. As described above, the effective bit rate can be defined as a data rate that the system should be provisioned (and in some cases dynamically provisioned) to maintain an acceptable QoE level for end user applications.

Figure 2:
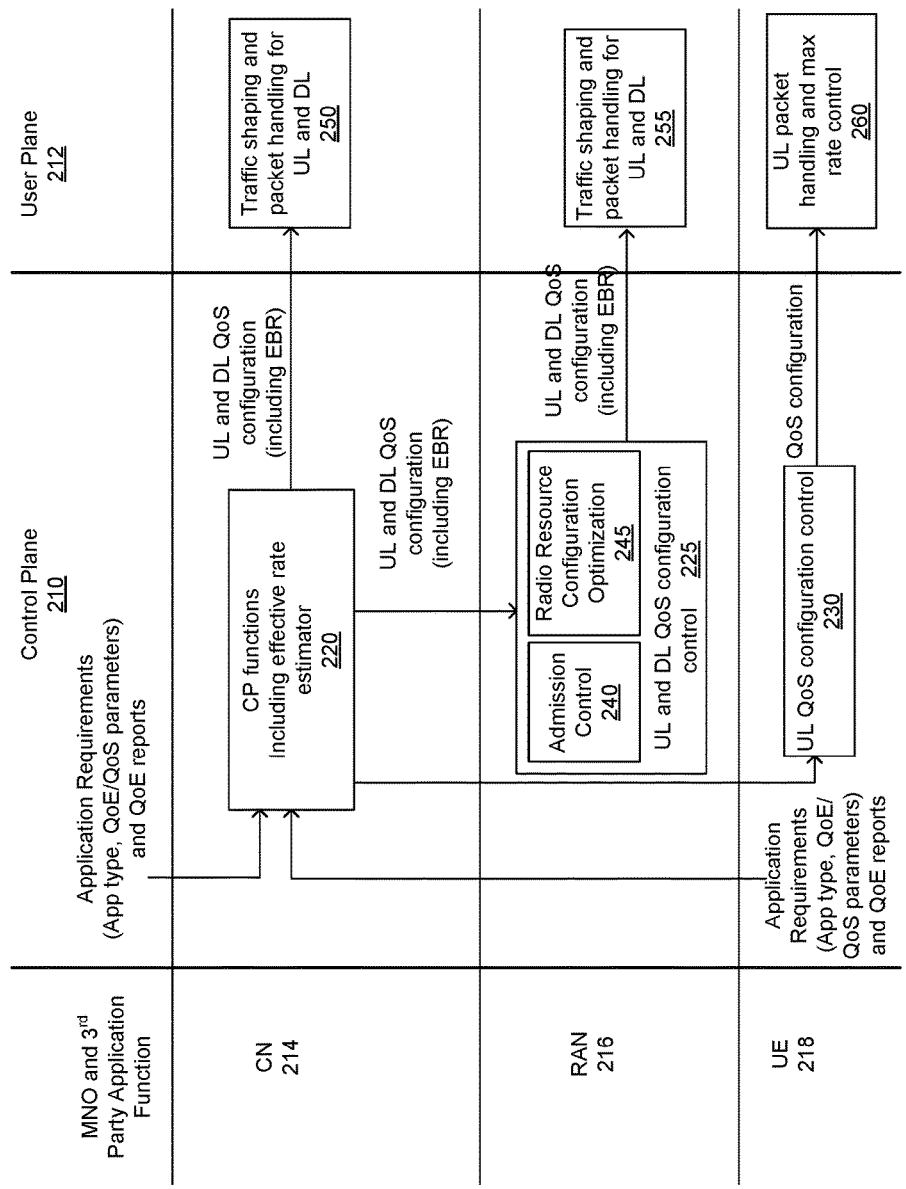
FIG. 2 is component diagram illustrating an embodiment of network functions including a CP with a function to estimate the EBR and some network functions that use EBR.

FIG. 2 is a component diagram illustrating the CP 210 with an estimator function 220 to estimate the EBR and some network functions that can make use of EBR. The network functions include a UL and DL QoS configuration control function 230 in the RAN 216 and the UL QoS configuration control function 230 in the UE 218. The EBR estimator 220 takes the QoE and QoS application requirements from the service layer (message from the application servers or message from the UE 218) and QoE feedback parameters from UE 218 to compute statistical and dynamic EBRs. The EBRs are then sent to the Admission Control 240 and Radio Resource Optimization 245 functions of RAN 216 and UP resource management 250 of CN 214 and UP resource management 255 of RAN 216. The UL QoS configuration control function 230 may send a QoS configuration to the UP resource management 260 of the UE 218.

As described above, the EBR can be adjusted based on accumulated QoE reports. Unlike QoE reports, which could be sent from UE every few seconds (e.g., every 2-10 seconds), the EBR can be adjusted every tens of seconds, for example, every 10 seconds, 30 seconds or longer, depending on the operator's QoE/QoS policy control in order to provide stable QoE levels to users.

Figure 3A:
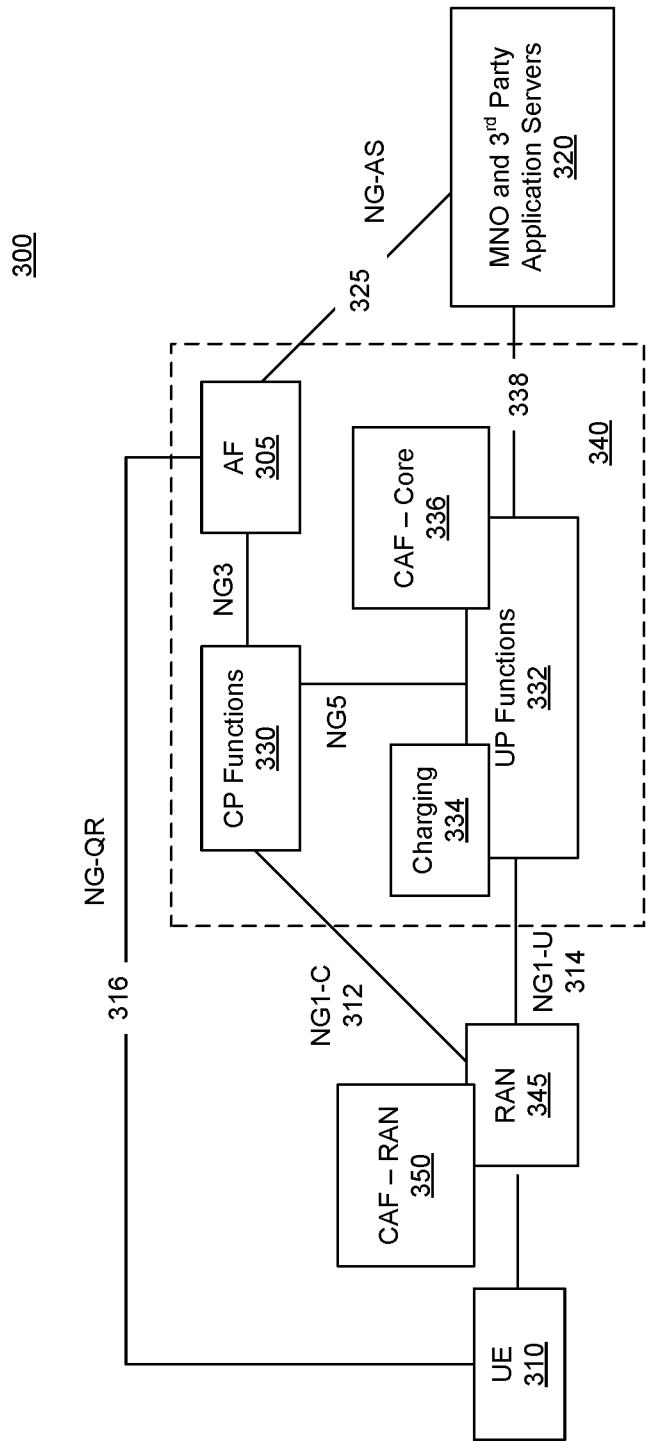
FIG. 3A is a block diagram illustrating an example of a secondary network architecture in which embodiments of the present invention may be practiced.

Referring to FIG. 3A, a block diagram is presented to illustrate an example of a system arranged to enable QoS/QoE exchange with one or more application servers. FIG. 3A illustrates a secondary network architecture in which embodiments of the present disclosure may be practiced. The system of FIG. 3A can enable context-aware QoS reporting. A mobile device, such as UE 310 connects to a radio access network 345. In some embodiments, this is a next generation radio access network that includes a RAN specific context awareness function 350. Traffic from UE 310 is divided into control plane traffic that is transmitted over link NG1-C 312 to Control Plane Functions 330, and user plane traffic that is transmitted over link NG1-U 314. User Plane traffic is transmitted to UP functions 332. The traffic through the UP is subject to charging, and is monitored by charging function 334 to enable billing and other charging related services. The functioning of the UP makes use of Core Network context awareness functions 336. In the control plane, AF 305 communicates with UE 310 over logical link NG-QR 316 for quality of service requirements. The control and user planes, along with their related functions make up the core network 340, which in the context of the current discussion may be a next generation core network. Application Servers 320 communicate with AF 305 over a link such as the Next Generation Application server interface NG-AS 325. Control information is exchanged over this link that allows for QoS and QoE information to be provided to the control plane, allowing for better management of the user plane traffic between the UE 310 and the Application Servers 320, which is carried to the UP Functions 332 over link 338. It is understood that the AF 305 in FIG. 13A refers to a network element, such as a network exposure function (NEF), a policy control function (PCF), or another network element in the core network.

Figure 3B:
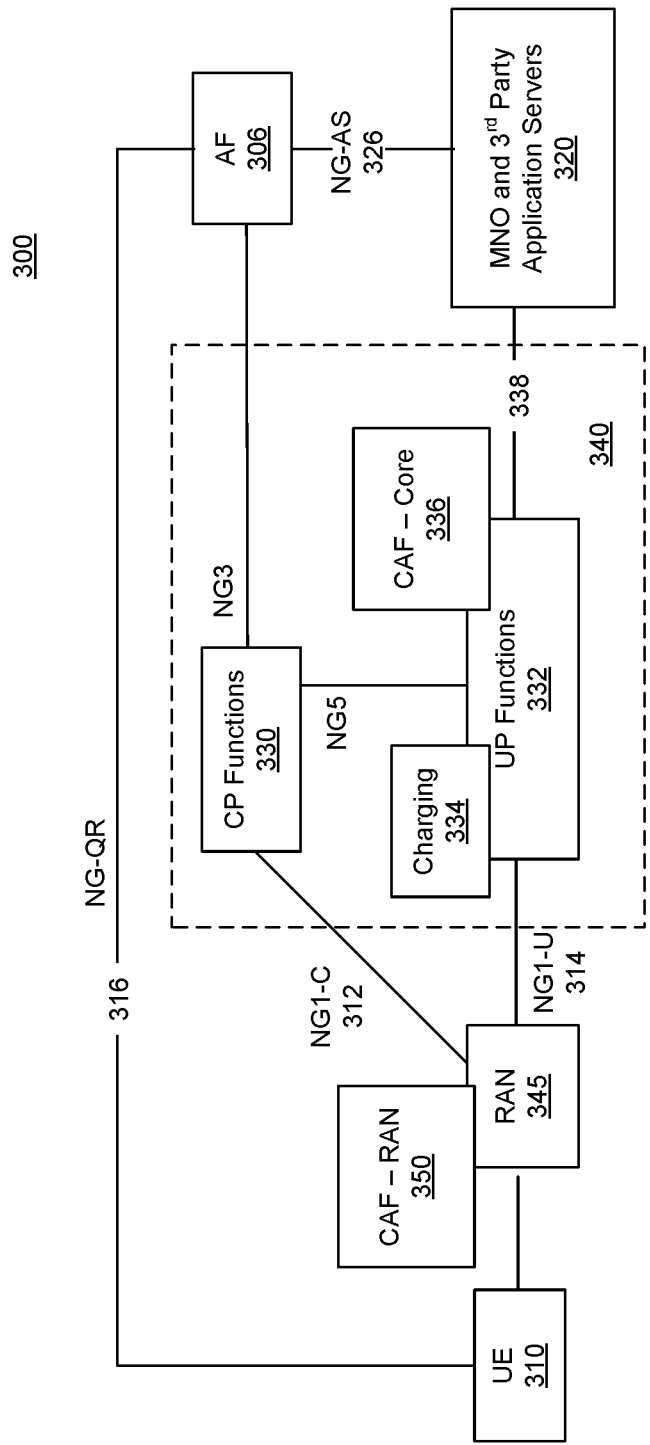
FIG. 3B is a block diagram illustrating an example of a secondary network architecture in which embodiments of the present invention may be practiced

FIG. 3B is a block diagram of an example of a secondary network architecture in which embodiments of the present invention may be practiced. The AF 306 is an external function that supports communications between the CP Function and the UE (through NG-QR/NG3 interface). The UE and Application Servers can send the CP Functions the required priority, QoS, QoE of flows or services.

The QoE reports are customized for different traffic types, including real-time and non-real-time video services. The QoE reports include information to identify flows and services (e.g., IP 5-tuple information, user subscriber number, TMSI), and application status (e.g., playout buffer size, service interruption time, and whether the application is background).

A Content requirement Awareness function in the Core (CAF-Core) 336 supports a mechanism to identify the application sessions (e.g., a video download, a web page download, listening to music, posting to social media network, etc.) and to enforce QoS policies related with the detected applications. It receives QoS policies from the Core CP. Application detection is achieved by means of non-standardized algorithms (e.g., usage pattern, heuristics). CAF-Core 336 performs QoS enforcement in the CN based on QoS policies received from the Core CP.

The CAF-Core 336 is able to process QoS policies and is able to derive dynamic QoS targets and local enforcement actions in the CN. As long as it is within the limits of the QoS policies provided by the NextGen core CP functions 330, it is able to update them in real-time based on the current content requirement of the user plane traffic mix, simultaneous competing flows and network status and resource availability. Thus CAF-Core 336 is bound to enforce QoS policies within the provided policy limits and there should be no deviation outside the range.

The Content requirement Awareness function in the RAN (CAF-RAN) 350 supports a mechanism to identify the application sessions in case (e.g., a video download, a web page download, listening to music, posting to social media network, etc.) and to enforce QoS policies. It receives QoS policies from the Core CP. CAF-RAN 350 will use the application detection information provided by the core and it can infer additional specific requirements for the certain application session, shape the traffic for the given session at the same time. CAF-RAN 350 performs QoS enforcement based on QoS policies received from the Core CP. This includes traffic shaping for DL and UL traffic. DL traffic shaping helps to control the flow of UL traffic.

The CAF-RAN 350 is able to process QoS policies and is able to derive dynamic QoS targets and local enforcement actions in the RAN. As long as it is within the limits of the QoS policies provided by the NextGen core, CAF-RAN 350 is able to update them in real-time based on the current content requirement of the user plane traffic mix, simultaneous competing flows and network status and resource availability, and the application status information from the user's QoE report (e.g., the buffer status, size and playing duration of the coming segment, and playout status, whether the application is background, etc.). Thus, CAF-RAN 350 is bound to enforce QoS policies within the provided policy limits and there should typically be no deviation outside the range. This should ensure that the RAN 345 is bound by the charging performed in the core, thus, there should be no impact to charging performed in the UP function within the core. The amount of specific traffic charged by the Core (in terms of bits) may be provided to RAN 345 in terms of packet marking along with application marking so CAF-RAN 350 can enforce and preserve charged capacity.

It is understood that application detection typically requires the establishment and maintenance of the local state, which may have to be transferred between CAF-RANs 350 to ensure successful application detection despite UE mobility.

CAF-Core 336 can perform the application detection and provide that information in the form of packet marking based on the policies received from the CN CP. The traffic shaping and policy enforcement in the CAF-RAN 350 is bounded by the packet marking indicated by CAF-Core 336 and policies received from the CN CP that may refer to this marking. This should help to facilitate coordinated functioning of the CAF-Core 340 and CAF-RAN 350, and also ensure that the charging is performed for the application as indicated by the CAF-Core 336.

In some embodiments, CAF-RAN 350 uses the application detection information provided by the core to infer specific requirements for certain application sessions, without requiring further application detection and considering multi-vendor deployments (e.g., different vendors for CAF-Core and CAF-RAN; multiple RAN vendors, home routed scenario, etc.).

In some embodiments, there is packet marking in the Core Network and, optionally, the packet marking and the application detection in (R)AN may both apply for the same UE traffic.

QoS policies are stored at the CN CP functions 330. At session establishment, subscriber and application specific policies are transferred to the CAF-RAN 350 and in the CN UP functions 332. During the session, the UE 310 may send QoE reports to the CN CP functions 330, which include information to identify flows/services (e.g., IP 5-tuple, subscriber identification number) and the application status (e.g., the buffer status, size and playing duration of the coming segment, and playout status, whether the application is background, etc.). The CP functions 330 can adjust the QoS policies for the application flows and then forward the QoS policies to the UP function 332 and RAN 345 for optimizing resource usage and policy enforcement.

The UP function 332 in the core is responsible for traffic charging support (e.g., CDR, granted quota for on-line) based on the policies taking into account the outcome of CAF-Core 336. It also marks the traffic sent downlink to the RAN 345.

The operator provisions subscriber and application specific QoS policies in the NextGen Core CP functions 330. The CP functions 330 in the Core provides the policies to the RAN 345 and CN UP function 332. The enforcement actions are derived by the enforcement points according to the current content requirement of the user plane traffic mix, simultaneous competing flows, and network status and resource availability. Traffic charging support (e.g., CDR, granted quota for on-line) based on the policies taking into account the outcome of CAF-Core 336 is performed in the CN UP function 332.

Figure 4A:
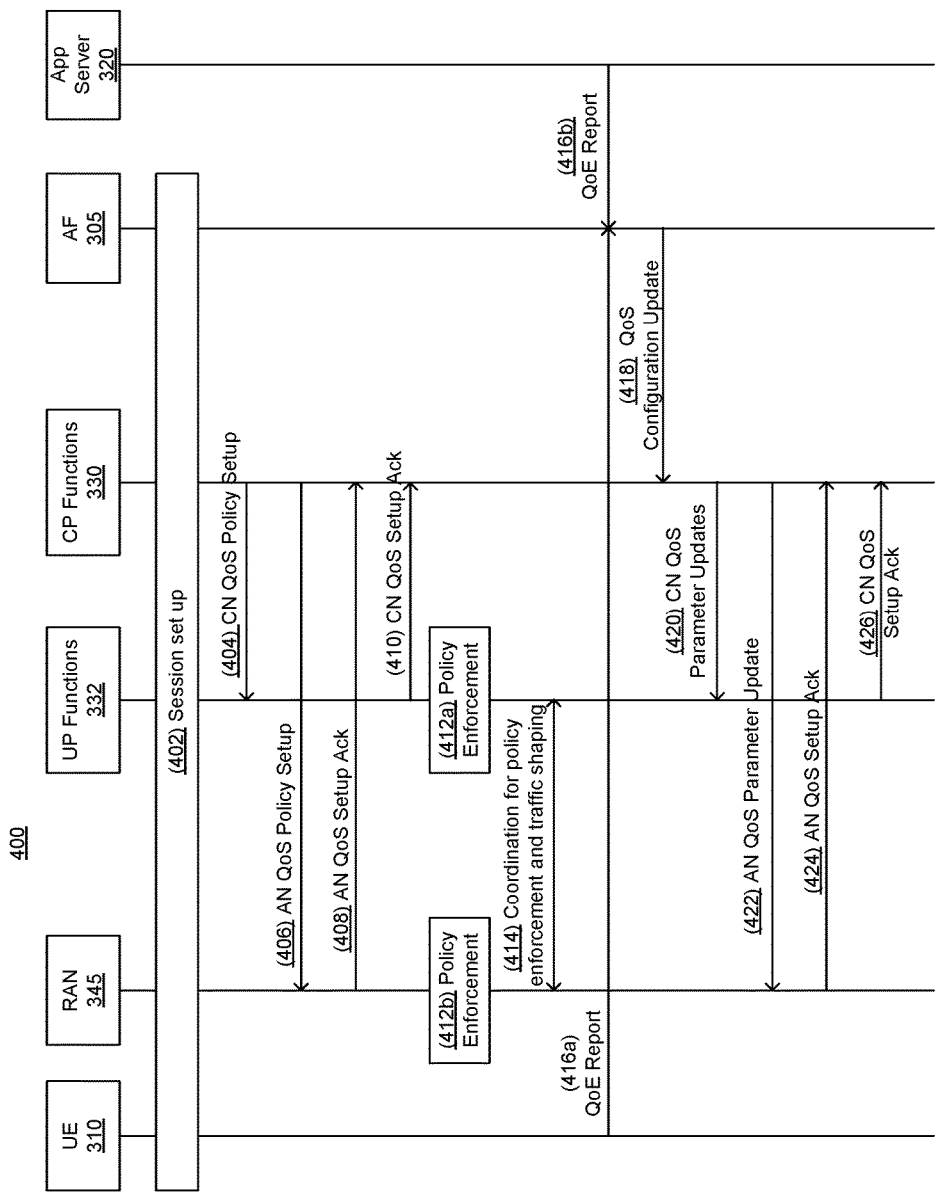
FIG. 4A illustrates, in a message flow diagram, an example of a method carried out by the nodes illustrated in FIG. 3A.
Figure 4B:
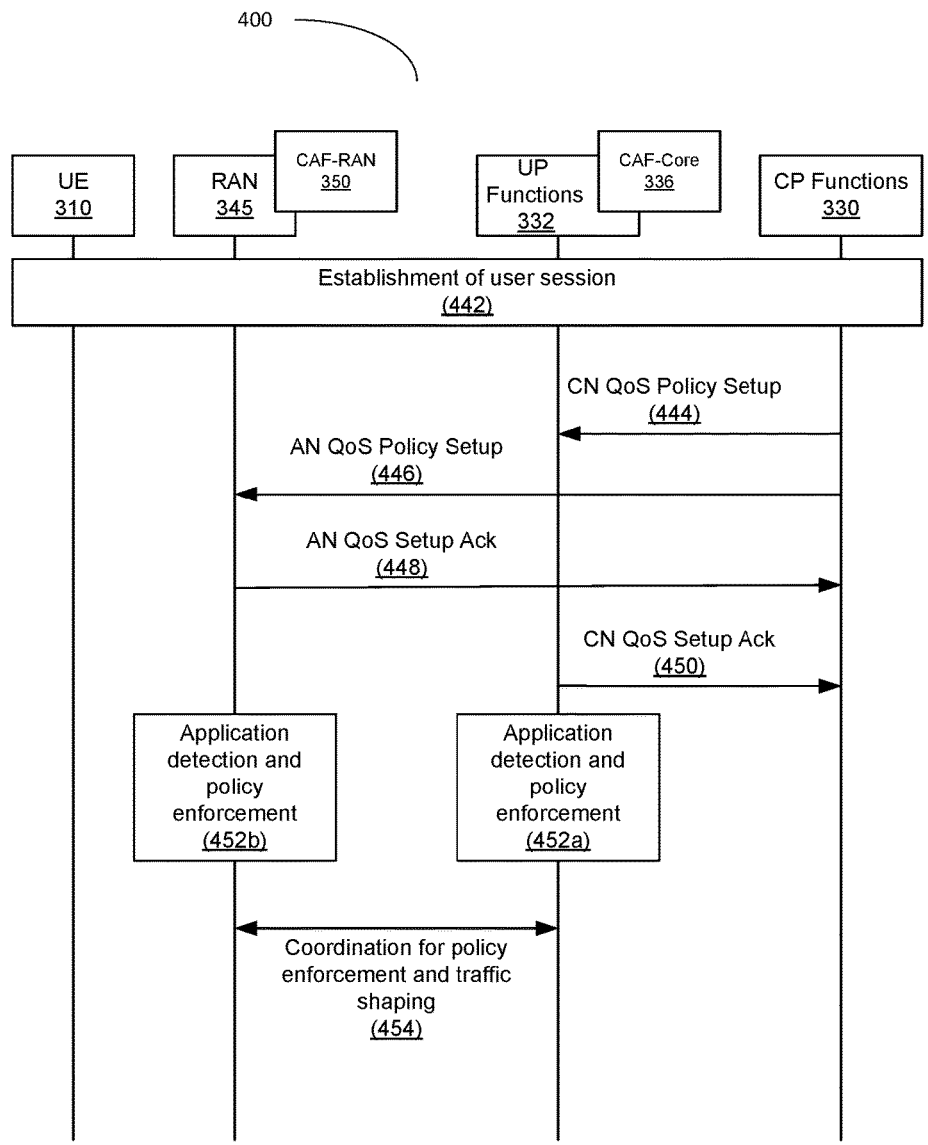
FIG. 4B is a message flow diagram illustrating interaction among network functions when a QoE report is unavailable.
Figure 5:
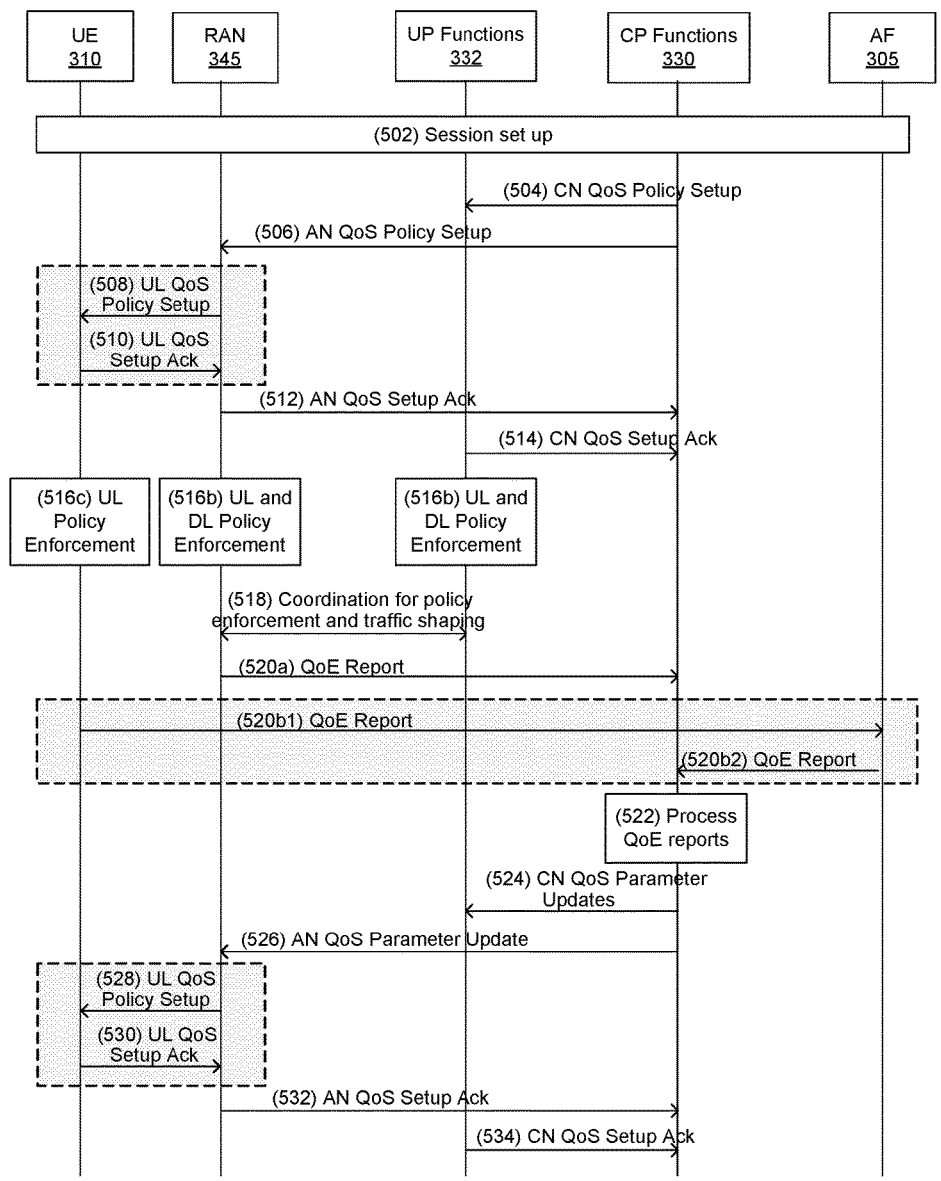
FIG. 5 is a message flow diagram illustrating interaction among network functions when a QoE report is available.

FIGS. 4 and 5 illustrate examples of the different sets of QoS policies that may be provided to the UP functions and RAN:

Intent level QoE and QoS policies which map to a set of flow that may be identified by a (packet marking, SDF descriptor) into abstract QoE and QoS targets, e.g., Voice type QoS, Smoothed Bit rate QoS (limit the bandwidth variation for the traffic), bulk traffic (traffic may be discarded when the radio conditions are bad or the cell too loaded), etc.

Transport QoS level policies which map a set of flow that may be identified by a (packet marking, SDF descriptor) into Explicit QoS targets (e.g., priority, delay, jitter, packet loss rate, etc.). Note that one of packet marking or SDF descriptor may be used in the RAN to enforce the QoS policies. Alternatively, both packet marking and SDF descriptor are used in the RAN to enforce the QoS policies.

CP functions in the CAF-RAN 350 and CAF-Core 336 are responsible to locally mapping Intent level QoS policies into Transport QoS level policies based on local CAF policies and on local (radio) conditions (e.g., current context of the user plane traffic mix, simultaneous competing flows and network status and resource availability), bound by the upper limits of intent level QoS policies.

In some embodiments, enforcement functions from different vendors in the same network may be able to derive the same or similar enforcement actions based on intent level QoS policies.

QoS enforcement action derivation process in the CAFs may be based on static information or additional information may need to be dynamically provided to the CAFs to facilitate the derivation process.

The following parameters are used for the QoS framework definition:

Policy description:
  Scope of definition: application name or application type.
  Definition of Intent: QoE level, which is customized for specific services (e.g., "High Definition experience for RT multimedia") and with explicit QoS target level (e.g. maximum packet delay 150 ms for IMS video).

Maximum Flow Bitrate: UL and DL bitrate value applicable for a single PDU session or aggregation of PDU sessions for a given UE. It indicates maximum bitrate authorized for the data session.

Allocation and Retention Priority level (ARP): it refers to the priority level, the pre-emption capability and the pre-emption vulnerability for a given PDU session.

Effective Bit Rate: As defined above, this is the bit rate the system should be dimensioned to provide a stable QoE range for single PDU flow.

It is noted that there can be multiple applications (e.g., video download, web browsing etc.) sessions within a single PDU session. QoS parameters (such as Policy Description, Maximum Flow Bit rate, Effective Flow Bit rate, and Allocation and Retention Priority level (ARP) are applicable the CN UP functions and the RAN.

The following reference points are assumed for the purpose of describing the QoS framework:

NG1-C: Reference point between the (R)AN and CP functions.

NG3: Reference point between the CP functions and an Application Function (AF).

NG5: Reference point between the CP functions and UP functions.

NG1-U: Reference point between the RAN and UP functions.

NR-Uu: Reference point between the UE and the Next-Gen-RAN.

NG-QR: Reference point between UE and AF

NG-AS: Reference point between AF and Application Server of MNO and third parties FIG. 4A is a signalling diagram illustrating a method (400) carried out by the nodes illustrated in FIG. 3A. As illustrated, the method includes the following steps:

(402). A data session for the UE 310 is setup. The setup process configures the manner in which user plane traffic between the UE 310 the network nodes is managed. The data session carries all traffic related to user session regardless of the QoS characteristics of individual traffic flows. UE 310 informs AF 305 of the required QoE and QoS for specific flows and servers. This may be performed using link NG-QR 316. UE 310 informs AF 305 which entity (either UE 310 or Application Server 320)) will report real-time QoE feedback parameters. In some embodiments the RAN 345 may, at the time of user plane session establishment, reject the request if sufficient radio resources are not available.

(404) and (406). In response to the session setup, CP functions 330, including function such as SMF, in the core network transmit subscriber-specific QoS parameters to UP Functions 332 and to the Access Network functions in the RAN 345. The UP functions 332 and the AN functions can then establish a set of QoS rules (overall a QoS policy) in accordance with the QoS (and possibly QoE) parameters provided.

(408) and (410). The UP functions 332 and Access Network functions in the RAN 345 acknowledge the subscriber-specific QoS policy configuration. In some embodiments, the AN functions in the RAN 345 groups define QoS framework for the radio access portion of the connection.

(412a). The UP functions 332 enforce the QoS policy and perform traffic shaping within CN as necessary.

(412b). The AN functions in the RAN 345 enforce the QoS policy and perform traffic shaping within RAN 345 as necessary.

(414). AN and UP functions exchange policy and policy enforcement information. This allows for a coordination between AN and UP functions so that the services and flows are managed according to configured QoS parameters.

(416a) or (416b). QoE reports are sent to AF 305 (from at least one of the UE 310 and the Application Server 320). These reports allow the AF 305 to update the CP functions 330 with performance data used to ensure that the QoE and QoS parameters can be kept updated. These reports provide data that can be used to generate QoS parameters for UP functions 332 and AN. It is understood that the AF 305 in FIG. 4A refers to a network element, such as a NEF, a PCF, a Network Data Analytics (NWDA) or another network element in the core network.

(418). AF 305 transmits QoS configuration updates to the CP functions 330. These updates may be representative of the data received in the report from the Application Server 320.

(420) and (422). CP functions 330 transmit QoS parameters to the UP and AN functions. These QoS parameters may differ from those provided in steps (404) and (406) if the parameters have to be adjusted to ensure that the QoS commitments are respected.

(424) and 426). AN and UP functions acknowledge the new QoS parameter updates.

In some scenarios, it may be possible that either UP functions or AN cannot support new QoS parameter updates. CP functions could send the QoS configuration update message to either UP functions or AN so that the network resources will not be over dimensioned.

In scenarios in which one of the UP and AN functions cannot support new QoS parameter updates, the UP or AN functions may inform the CP functions of the inability to properly update the parameters in the Ack message. In such a scenario, CP functions may send a QoS configuration update message to either the UP functions or the AN, to provide QoS feedback information. The recipient of the QoS feedback information, the UP functions or the AN, can adjust the QoE/QoS policy based upon the QoS feedback information to limit at least one allocated network resource. Limiting allocation of the at least one allocated network resource ensures that excess capacity is not allocated to an otherwise constrained communication channel.

In the previous embodiments, the AF is placed in the control plane. Alternative implementations can be possible. For example, the Application Function can be distributed in CN-GW, AN-GW, and radio nodes to avoid computational bottleneck or to provide independent QoE and QoS support policies for individual network segments. It is understood that the Application Function (AF) as described in this paragraph refers to a network function.

FIG. 4B is a message flow diagram illustrating interaction among network functions when a QoE report is unavailable (440).

At step (400) a data session for user plane traffic is established between the UE 310 and a data network. The data session carries all traffic related to the user session regardless of the QoS characteristics of individual traffic flows. It is noted that at the time of user plane session establishment, RAN 345 has the possibility to reject the request, if sufficient radio resources are not available.

At steps (444) and (446), the CP functions 330 in the core signals a subscriber specific QoS policy to the CAF-Core 336 within UP Functions 332, and to the CAF-RAN 350 within the (RAN 345. For intent level policies, the CAF-Core 336 in the UP functions 332 and the CAF-RAN 350 in the RAN 345 may be able to derive Transport (including RAN) QoS targets and may ensure that the derived Transport QoS level policies are within the intent level.

In some embodiments, QoS enforcement may be triggered based on application detection.

At steps (448) and (450), the RAN 345 and the UP functions 332 acknowledge the subscriber specific QoS policy configuration. It is noted that it may be up to the RAN groups to define QoS framework in radio access.

At step (452a), the CAF-Core 336 within the UP functions 332 in the CN detects the user's bi-directional application session, derives its service requirements and required transport resources. Taking into account the QoS policies received in step (444), the CAF-Core 336 sets the transport QoS targets to be enforced by the UP functions 332. Transport QoS targets are autonomously self-calibrated and reconfigured in real time based on monitoring of this user's and other users' applications sessions and on transport network resource status.

It is noted that QoS policies may contain information about which traffic is prioritized. Different policies sent to the CAF functions are associated with priority rules. The relative priority between the flows is either explicitly provided by the CN CP function 330 as part of Transport QoS level policies or it corresponds to a local mapping in the CAF-RAN 350 from intent level QoS into transport QoS policies. The local mapping within CAF-RAN 350 is dynamic but it is bound by the policies provided by the CN CP function 330.

At step (452b), CAF-RAN 350 within the RAN 345 determines the user's bi-directional application session and derives the service requirements and required radio resources and uplink transport resources. Taking into account the QoS policies received in step (446), the CAF-RAN 350 configures the radio QoS targets to the radio scheduler and sets the transport QoS targets for uplink traffic. These radio QoS targets and uplink transport QoS targets are autonomously self-calibrated and reconfigured in real time based on monitoring of this user's and other users' applications sessions and on radio and transport network resource status. It is noted that this QoS framework may not require end-to-end bearers or tunneling in order to provide QoS differentiation.

At step (454), in-band coordination (i.e., using packet marking) Occurs between CAF-Core 336 and CAF-RAN 350 to ensure consistent policy enforcement.

FIG. 5 is a message flow diagram illustrating interaction among network functions when a QoE report is available (500).

At step (502), a data session for user plane traffic is established between the UE 310 and a data network. The data session carries all traffic related to user session regardless of the QoS characteristics of individual traffic flows. UE 310 sends a message to the CP functions 330 providing codec capabilities, and required QoE and QoS for specific flows and servers. UE 310 sends a message to the CP functions 330 providing which entity (either UE 310 or Application Server 320) will report real-time QoE feedback parameters. CP functions 330 inform AF 305 to support UE flows and services. AF 305 prepares a data record for new flow/service.

It is noted that, at the time of user plane session establishment, RAN 345 has the possibility to reject the request, if sufficient radio resources are not available, by using a statistical EBR sent from CP functions 330.

At step (504), the CN CP functions 330 signals subscriber specific QoS parameters to the UP Functions 332 for uplink and downlink communications.

At step (506), the CN CP functions 330 signals subscriber specific QoS parameters to the RAN 345 for uplink and downlink communications.

Optionally, at step (508), if the UL traffic is requested, AN functions of RAN 345 signals UE 310 the UL QoS parameters. Alternatively, the UL QoS parameters can be sent from CN CP functions 330.

Optionally, at step (510), if the UL traffic is requested, UE 310 acknowledges the UL QoS configuration.

At step (512), the AN functions of RAN 345 acknowledge the subscriber specific QoS policy configuration, after admission control in RAN 345 are acknowledged.

At step (514), the UP functions 332 acknowledge the subscriber specific QoS policy configuration, after resource establishment in UP functions are acknowledged.

At step (516a), the UP functions 332 enforce the QoS policy and performs traffic shaping within CN.

At step (516b), the AN functions of RAN 345 enforce the QoS policy and performs traffic shaping within RAN 345.

Optionally, at step (516c), if UL traffic is present, UE 310 applies QoS policy and performs traffic control in UL.

At step (518), messages are sent between the AN functions of RAN 345 and UP functions 332 to coordinate delivery of services and flows according to configured QoS parameters.

At step (520a) or steps (520b1) and (520b2), QoE reports are sent to CP functions 330.

At step (522), CP functions 330 process QoE reports and adjust QoS parameters, including EBR.

At steps (524) and (526), if QoS parameters are changed, the CP function 330 sends QoS update messages to UP functions 332 and AN functions of RAN 345.

Optionally, at steps (528) and (530), if UL traffic is present, the AN functions of RAN 345 informs the UE 310 of relevant QoS parameters.

At steps (532) and (534), AN functions of RAN 345 and UP functions 332 acknowledge the new QoS parameter updates. The AN functions may perform radio resource optimization to meet new QoS requirements. In some embodiments it is possible that, either UP functions 332 or RAN 345 cannot support new QoS parameter updates. In this case CP functions 330 could send a QoS configuration update message to either UP functions 332 or RAN 345 so that the network resources will not be over dimensioned.

Figure 6:
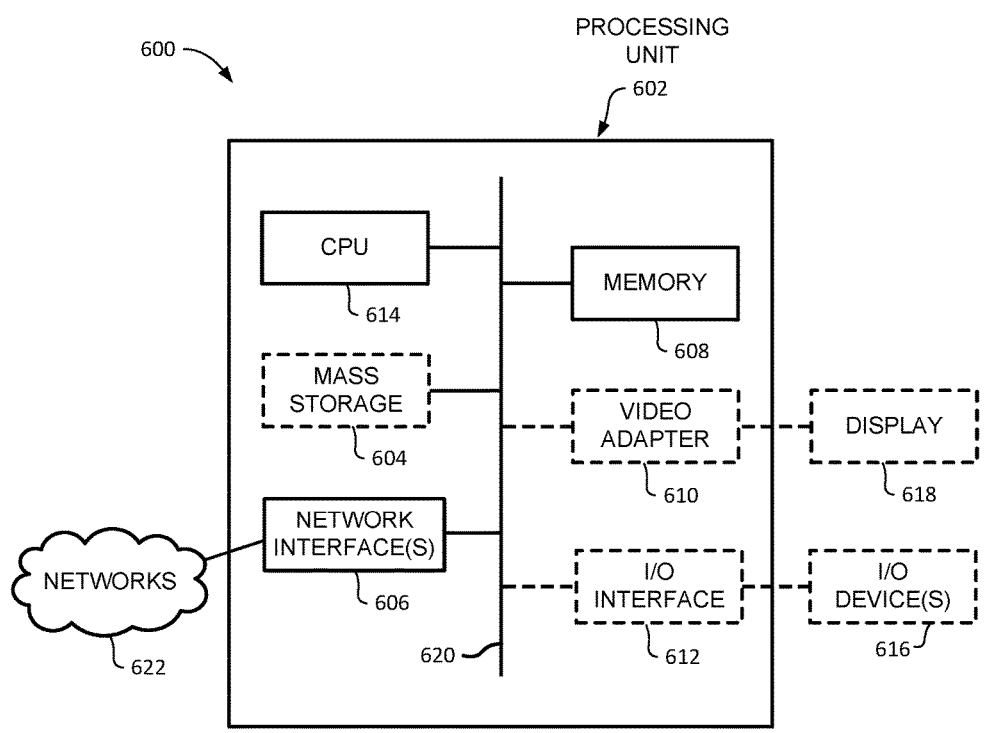
FIG. 6 illustrates, in a block diagram, of a computing system that may be used for implementing the devices and methods disclosed herein.

FIG. 6 is a block diagram of a computing system 600 that may be used for implementing the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 600 includes a processing unit 602, also referred to as processing circuitry. The processing unit 602 typically includes a central processing unit (CPU) 614, a bus 620 and a memory 608, and may optionally also include a mass storage device 604, a video adapter 610, and an I/O interface 612 (shown in dashed lines). Additionally or alternatively to a central processing unit and memory, other types of processing circuitry, such as application specific integrated circuits, or other digital and/or analog circuitry, can be provided and configured to electronically perform various computing and communication operations as described herein.

In various embodiments, the computing system 600 is configured and used as an apparatus for use with a communication network. The computing system 600 may for example correspond to an apparatus residing in or operatively coupled to a control plane of the communication network. The apparatus may be provided using dedicated computing hardware, or general-purpose computing hardware, for example configured through virtualization. The apparatus may be programmed to host an application function which interoperates with the network to transmit and receive control plane messages as described herein.

The CPU 614 may comprise any type of electronic data processor. The memory 608 may comprise any type of non-transitory system memory such as static random access memory (SRAM), dynamic random access memory (DRAM), synchronous DRAM (SDRAM), read-only memory (ROM), or a combination thereof. In an embodiment, the memory 608 may include ROM for use at boot-up, and DRAM for program and data storage for use while executing programs. The bus 620 may be one or more of any type of several bus architectures including a memory bus or memory controller, a peripheral bus, or a video bus.

The mass storage 604 may comprise any type of non-transitory storage device configured to store data, programs, and other information and to make the data, programs, and other information accessible via the bus 620. The mass storage 604 may comprise, for example, one or more of a solid state drive, hard disk drive, a magnetic disk drive, or an optical disk drive.

The video adapter 610 and the I/O interface 612 provide optional interfaces to couple external input and output devices to the processing unit 602. Examples of input and output devices include a display 618 coupled to the video adapter 610 and an I/O device 616 such as a touch-screen coupled to the I/O interface 612. Other devices may be coupled to the processing unit 602, and additional or fewer interfaces may be utilized. For example, a serial interface such as Universal Serial Bus (USB) (not shown) may be used to provide an interface for an external device.

The processing unit 602 may also include one or more network interfaces 606, which may comprise wired links, such as an Ethernet cable, and/or wireless links to access one or more networks 622. The network interfaces 606 allow the processing unit 602 to communicate with remote entities via the networks 622. For example, the network interfaces 606 may provide wireless communication via one or more transmitters/transmit antennas and one or more receivers/receive antennas. In an embodiment, the processing unit 602 is coupled to a local-area network or a wide-area network for data processing and communications with remote devices, such as other processing units, the Internet, or remote storage facilities.

Figure 7:
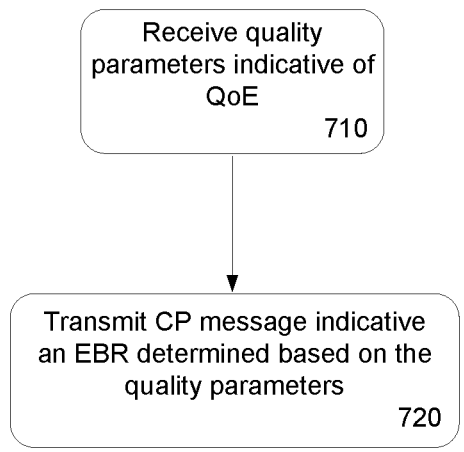
FIG. 7 is a flowchart illustrating a method for supporting operation of a communication network, in accordance with embodiments of the present invention.

FIG. 7 illustrates, in a flowchart, an example of a method for supporting operation of a communication network 700, in accordance with embodiments of the present invention. The method 700 may be performed by a networked computing device communicatively coupled to the communication network. In the method 700, the networked computing device receives quality parameters 710 using a network interface. The quality parameters are indicative of a QoE measured in association with delivery of a service to the UE via the communication network during a prior period. The networked computing device then transmits a CP message 720 using the network interface. The CP message is indicative of an EBR, which is determined at the computing device based on the quality parameters. The EBR conveyed by the CP message is used by one or more devices in the communication network to adjust network operations associated with delivery of the service. In particular, network operations are adjusted based on the transmitted EBR to reserve sufficient user plane resources to support the effective bit rate.

In some implementations, adjusting network operations comprises adjusting an allocation of radio resources used in delivery of the service via a radio access network portion of the communication network.

The present disclosure further provides a method of operating a communication network comprising a core network portion and a radio access network portion. This method is performed by one or more CP networked computing devices. The method comprises providing a QGCC for conveying MBR, wherein the EBR is provided using the method 700 as illustrated in FIG. 7.

Figure 8:
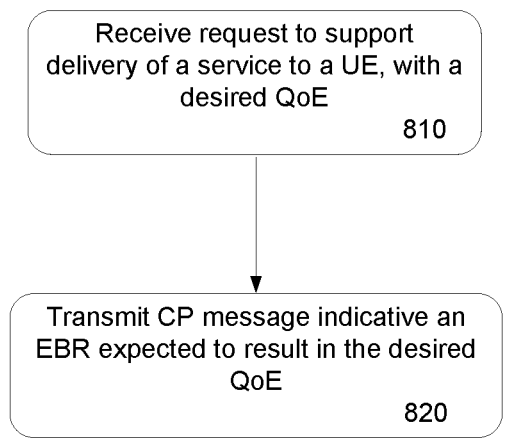
FIG. 8 is a flowchart illustrating a method for supporting operation of a communication network, in accordance with embodiments of the present invention.

FIG. 8 illustrates, in a flowchart, another example of a method for supporting operation of a communication network 800, in accordance with embodiments of the present invention. The method 800 may be performed by a networked computing device communicatively coupled to the communication network. In the method 800, the networked computing device receives a request, using a network interface, to support delivery of a service to a UE 810 via the communication network. The request includes an indication of the desired QoE level for the service. The networked computing device then transmits a CP message 820 using the network interface. The CP message is indicative of a EBR for the desired QoE of the requested service. In the method 800, the CP message is used for admitting or rejecting the request to support delivery of a service.

The method 800, optionally additionally includes receiving quality parameters (not shown in FIG. 8) using the network interface, wherein the quality parameters are indicative of the desired QoE level, and determining the EBR based on the quality parameters.

As described elsewhere herein, the EBR may be determined based on one or a combination of: current network loading conditions; a traffic type of the service; an ABR expected for supporting delivery of the service; and a MBR expected for supporting delivery of the service.

It will be readily understood that, throughout the preceding discussion, the above-described network functionalities and operations may correspond to a method for use in supporting operation of a communication network, such as a 5G wireless communication network. The method may involve computer-implemented functions, namely functions which are implemented by one or more computing, communication and/or memory components of the network infrastructure. These components may take various forms, such as specific servers or general-purpose computing, communication and/or memory devices which are configured to provide the required functionality through virtualization technologies. The method may involve the operation of one or more network components in order to improve the operation of the network. As such, with the communication network viewed as an apparatus, embodiments of the present disclosure may be directed to improving internal operations of the communication network.

Further, it will be readily understood that embodiments of the present disclosure relate to a communication network system or associated apparatus thereof, which is configured to perform the above-described network functionalities and operations. Again, the system or apparatus may comprise one or more computing, communication and/or memory components of the network infrastructure, which may take various forms, such as specific servers or general-purpose computing, communication and/or memory devices which are configured to provide the required functionality through virtualization technologies. Various methods as disclosed herein may be implemented on one or more real or virtual computing devices, such as devices within a communication network control plane, devices operating in the data plane, or a combination thereof. Computing devices used to implement method operations may include a processor operatively coupled to memory, the memory providing instructions for execution by the processor to perform the method as described herein.

Various embodiments of the present disclosure utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

All publications, patents and patent applications mentioned in this Specification are indicative of the level of skill of those skilled in the art to which this invention pertains and are herein incorporated by reference to the same extent as if each individual publication, patent, or patent applications was specifically and individually indicated to be incorporated by reference.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. An apparatus for use with a communication network, comprising a network interface configured to transmit and receive control plane messages and processing circuitry, the apparatus configured to:
receive quality parameters using the network interface, the quality parameters indicative of a quality of experience level measured in association with delivery of a service to the UE via the communication network during a prior period; and
transmit a control plane message using the network interface, the control plane message indicative of an effective bit rate which is determined at the apparatus based on the quality parameters, wherein the effective bit rate is a communication network user plane bit rate which, when used in delivery of the service, is expected to result in a desired quality of experience level of the service;
wherein the effective bit rate conveyed via the control plane message is used by one or more devices in the communication network to adjust network operations associated with delivery of the service, wherein adjusting network operations comprises reserving user plane resources to support the effective bit rate.

2. The apparatus of claim 1, wherein adjusting network operations comprises adjusting an allocation of radio resources used in delivery of the service via a radio access network portion of the communication network.

3. The apparatus of claim 1, wherein adjusting network operations comprises adjusting one or more of: an allocation of core network resources used in delivery of the service; prioritization of packets corresponding to delivery of the service; UE behaviour; and application server behaviour.

4. The apparatus of claim 1, wherein adjusting network operations comprises causing the service to be delivered at an average bit rate that is within predetermined service parameters, or causing the service to be delivered at a maximum bit rate that is within predetermined service parameters, or both, and wherein said adjusting of network operations is performed at least partially by one or both of: a QoS control function; and a rate control function.

5. The apparatus of claim 1, wherein when the apparatus has transmitted a previous control plane message indicative of a previous effective bit rate and the received quality parameters correspond to a quality of experience that is lower than a predetermined threshold derived from the desired quality of experience level, the apparatus is configured to set the effective bit rate at a value greater than the previous effective bit rate.

6. The apparatus of claim 1, wherein when the apparatus has transmitted a previous control plane message indicative of a previous effective bit rate and the received quality parameters correspond to a quality of experience that is higher than a predetermined threshold derived from the desired quality of experience level, the apparatus is configured to set the effective bit rate at a value less than the previous effective bit rate.

7. The apparatus of claim 1, wherein the apparatus is configured to present an application function of the network corresponding to one or more of: an application server hosting the application function; a network data analytics (NWDA) function residing within a core network portion of the communication network; another type of function residing within a core network portion of the communication network; a function residing in a radio access network portion of the communication network; a function residing outside the core network portion of the communication network but within a trusted domain; and a function residing outside the core network portion of the communication network and within a non-trusted domain.

8. The apparatus of claim 1, wherein the apparatus comprises an application function portion and an application server portion, the application server portion configured to receive quality of experience reports indicative of the quality parameters; and forward aggregate information indicative of the quality parameters to the application function portion, the application function portion configured to determine the effective bit rate based on the aggregate information.

9. An apparatus for use with a communication network, comprising a network interface configured to transmit and receive control plane messages and processing circuitry, the apparatus configured to:
- receive a request message using the network interface, the request message including a request to support delivery of a service to a UE via the communication network and at a desired quality of experience level; and
- transmit a control plane message using the network interface, the control plane message indicative of an effective bit rate, wherein the effective bit rate is a communication network user plane bit rate which, when used in delivery of the service, is expected to result in the desired quality of experience level for the service,
- wherein the control plane message is used for admitting or rejecting the request.

10. The apparatus of claim 9, further configured to receive quality parameters using the network interface, the quality parameters indicative of the desired quality of experience level, wherein the effective bit rate is determined at the apparatus based on the quality parameters.

11. The apparatus of claim 10, wherein the effective bit rate is determined from the quality parameters based upon a predetermined relationship, said relationship determined based on one or more of: a numerical model of aspects of the communication network; simulation of aspects of the communication network; and data indicative of aspects of the communication network observed during prior operation thereof.

12. The apparatus of claim 9, wherein the control plane message is used for reserving resources of the communication network for supporting delivery of the service at the desired quality of experience level.

13. The apparatus of claim 9, wherein the effective bit rate is determined at the apparatus based on one or a combination of: current network loading conditions; a traffic type of the service; an average bit rate expected for supporting delivery of the service; and a maximum bit rate expected for supporting delivery of the service.

14. A communication network comprising a core network portion and a radio access network portion, the communication network comprising one or more control plane networked computing devices configured to:
- provide a quality-guaranteed communication channel for conveying a user plane data flow to or from a user equipment (UE), the channel being characterized by an effective bit rate, an average bit rate, and a maximum bit rate,
- wherein the effective bit rate is provided using the apparatus of claim 1.

15. The communication network of claim 14, wherein the effective bit rate, the average bit rate, and the maximum bit rate are mapped to support the user plane data flow, and wherein the user plane data flow is a guaranteed bit rate data flow, a non-guaranteed bit rate data flow, a data flow carrying voice information, or a data flow carrying video information.

16. A method for supporting operation of a communication network, the method performed by a networked computing device communicatively coupled to the communication network and comprising:
- receiving quality parameters using a network interface, the quality parameters indicative of a quality of experience level measured in association with delivery of a service to the UE via the communication network during a prior period; and
- transmitting a control plane message using the network interface, the control plane message indicative of an effective bit rate which is determined at the computing device based on the quality parameters, wherein the effective bit rate is a communication network user plane bit rate which, when used in delivery of the service, is expected to result in a desired quality of experience level of the service;
- wherein the effective bit rate conveyed via the control plane message is used by one or more devices in the communication network to adjust network operations associated with delivery of the service, wherein adjusting network operations comprises reserving user plane resources to support the effective bit rate.

17. The method of claim 16, wherein adjusting network operations comprises adjusting an allocation of radio resources used in delivery of the service via a radio access network portion of the communication network.

18. A method for supporting operation of a communication network, the method performed by a networked computing device communicatively coupled to the communication network and comprising:
- receiving a request message using a network interface, the request message including a request to support delivery of a service to a UE via the communication network and at a desired quality of experience level; and
- transmitting a control plane message using the network interface, the control plane message indicative of an effective bit rate, wherein the effective bit rate is a communication network user plane bit rate which, when used in delivery of the service, is expected to result in the desired quality of experience level for the service,
- wherein the control plane message is used for admitting or rejecting the request.

19. The method of claim 18, further comprising receiving quality parameters using the network interface, the quality parameters indicative of the desired quality of experience level, and determining the effective bit rate based on the quality parameters.

20. The method of claim 18, further comprising determining the effective bit rate based on one or a combination of: current network loading conditions; a traffic type of the service; an average bit rate expected for supporting delivery of the service; and a maximum bit rate expected for supporting delivery of the service.

21. A method of operating a communication network comprising a core network portion and a radio access network portion, the method performed by one or more control plane networked computing devices and comprising:
- providing a quality-guaranteed communication channel for conveying a user plane data flow to or from a user equipment (UE), the channel being characterized by an effective bit rate, an average bit rate, and a maximum bit rate,
- wherein the effective bit rate is provided using the method of claim 16.

* * * * *